US012763944B2

(12) United States Patent
Kunz et al.

(10) Patent No.: US 12,763,944 B2
(45) Date of Patent: Oct. 13, 2026

(54) SYNCHRONIZING DEVICES BASED ON A SEQUENCE NUMBER OR KEY MISMATCH

(71) Applicant: Lenovo (United States) Inc., Morrisville, NC (US)

(72) Inventors: Andreas Kunz, Ladenburg (DE); Sheeba Backia Mary Baskaran, Friedrichsdorf (DE)

(73) Assignee: Lenovo (United States) Inc., Morrisville, NC (US)

( * ) Notice: Subject to any disclaimer, the term of this patent is extended or adjusted under 35 U.S.C. 154(b) by 28 days.

(21) Appl. No.: 18/935,272

(22) Filed: Nov. 1, 2024

(65) Prior Publication Data

US 2026/0128876 A1 May 7, 2026

(51) Int. Cl.

| | |
|---|---|
| ***H04L 9/08*** | (2006.01) |
| ***G16Y 40/10*** | (2020.01) |
| ***H04L 67/1095*** | (2022.01) |
| ***H04W 12/065*** | (2021.01) |
| ***H04W 12/12*** | (2021.01) |
| ***H04W 12/69*** | (2021.01) |

(Continued)

(52) U.S. Cl.

CPC .............. *H04L 9/088* (2013.01); *G16Y 40/10* (2020.01); *H04L 67/1095* (2013.01); *H04W 12/065* (2021.01); *H04W 12/12* (2013.01); *H04W 12/69* (2021.01); *H04W 12/71* (2021.01); *H04W 12/75* (2021.01)

(58) Field of Classification Search

CPC ..... H04L 9/088; H04L 67/1095; G16Y 40/10; H04W 12/065; H04W 12/12; H04W 12/69; H04W 12/71; H04W 12/75

See application file for complete search history.

(56) References Cited

U.S. PATENT DOCUMENTS

| | | | | |
|---|---|---|---|---|
| 10,158,991 | B2 * | 12/2018 | Link, II | H04W 12/069 |
| 10,694,376 | B2 * | 6/2020 | Kang | H04W 88/18 |
| 11,552,938 | B2 * | 1/2023 | Katayama | G06F 21/44 |

(Continued)

FOREIGN PATENT DOCUMENTS

| | | | |
|---|---|---|---|
| CN | 1943131 | A | 4/2007 |
| CN | 114510685 | A | 5/2022 |

(Continued)

OTHER PUBLICATIONS

Kothandaraman et al, Sequence number based secure routing algorithm for IoT networks, Material Today: Proceedings, p. 1-7 (Year: 2020).*

(Continued)

*Primary Examiner* — Christopher A Revak

(74) *Attorney, Agent, or Firm* — Kunzler Needham Hilton

(57) ABSTRACT

Various aspects of the present disclosure relate to receiving a first request message comprising a first set of parameters. Aspects of the present disclosure may relate to determining, based on the first set of parameters and a corresponding set of parameters stored in an internet-of-things (IoT) device, a mismatch of a sequence number (SQN) or a security key. Aspects of the present disclosure may relate to generating a synchronization ID based on a device SQN. Aspects of the present disclosure may relate to transmitting a response message comprising at least an expected result based on a default ID of the IoT device, and the device SQN.

20 Claims, 13 Drawing Sheets

(51) Int. Cl.
*H04W 12/71* (2021.01)
*H04W 12/75* (2021.01)

(56) References Cited

U.S. PATENT DOCUMENTS

| | | | | |
|---|---|---|---|---|
| 11,659,387 | B2 * | 5/2023 | Nair | H04W 12/06 455/411 |
| 12,081,972 | B2 * | 9/2024 | Escott | H04L 9/3273 |
| 2017/0026408 | A1 * | 1/2017 | Kaushik | H04L 63/1466 |
| 2020/0359212 | A1 * | 11/2020 | Chen | H04L 63/102 |
| 2022/0303310 | A1 * | 9/2022 | Thakkar | H04L 63/0272 |
| 2026/0129438 | A1 * | 5/2026 | Kunz | H04W 12/06 |

FOREIGN PATENT DOCUMENTS

| | | | | |
|---|---|---|---|---|
| WO | 2005065296 | A1 | 7/2005 | |
| WO | WO-2008027621 | A1 * | 3/2008 | G06Q 20/10 |
| WO | WO-2021160996 | A1 * | 8/2021 | H04W 12/00 |
| WO | 2023161773 | A1 | 8/2023 | |
| WO | 2024088605 | A1 | 5/2024 | |

OTHER PUBLICATIONS

3GPP, “3rd Generation Partnership Project; Technical Specification Group Services and System Aspects; Study on Architecture support of Ambient power-enabled Internet of Things (Release 19)”, 3GPP TR 23.700-13 V1.1.0, Oct. 2024, pp. 1-204.

3GPP, “3rd Generation Partnership Project; Technical Specification Group Services and System Aspects; Study on Security Aspect of Ambient IoT Services in 5G (Release 19)”, 3GPP TR 33.713 V0.4.0, Oct. 2024, pp. 1-80.

3GPP, “3rd Generation Partnership Project; Technical Specification Group Services and System Aspects; Security architecture and procedures for 5G system (Release 19)”, 3GPP TS 33.501 V19.0.0, Sep. 2024, pp. 1-333.

PCT/IB2025/061137, “Notification of Transmittal of the International Search Report and the Written Opinion of the International Searching Authority, or the Declaration”, International Searching Authority, Feb. 2, 2026, pp. 1-23.

PCT/IB2025/061141, “Notification of Transmittal of the International Search Report and the Written Opinion of the International Searching Authority, or the Declaration”, International Searching Authority, Feb. 2, 2026, pp. 1-22.

Nokia, “Update of Solution #1: AIoT temporary ID control”, 3GPP TSG-WG SA2 Meeting #162 S2-2404531, Apr. 15-19, 2024, pp. 1-3.

Sony, “Solution on Privacy Protection for AIoT device”, 3GPP TSG-SA3 Meeting #118 S3-244124, Aug. 14-19, 2024, pp. 1-3.

Lenovo, “Resolution of EN on Temporary ID synchronization”, 3GPP TSG-SA3 Meeting #119 S3-245064, Nov. 11-15, 2024, pp. 1-5.

Lenovo, “Update of solution#13 for key mismatch handling”, 3GPP TSG-SA3 Meeting #119 S3-245066, Nov. 11-15, 2024, pp. 1-5.

* cited by examiner

300

SYNCHRONIZING DEVICES BASED ON A SEQUENCE NUMBER OR KEY MISMATCH

TECHNICAL FIELD

The present disclosure relates to wireless communications, and more specifically to techniques for synchronizing devices in case of a sequence number (SQN) or key mismatch.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies (RATs) including third generation (3G) radio access technology, fourth generation (4G) radio access technology, fifth generation (5G) radio access technology, among other suitable radio access technologies beyond 5G (e.g., sixth generation (6G)).

SUMMARY

An article “a” before an element is unrestricted and understood to refer to “at least one” of those elements or “one or more” of those elements. The terms “a,” “at least one,” “one or more,” and “at least one of one or more” may be interchangeable. As used herein, including in the claims, “or” as used in a list of items (e.g., a list of items prefaced by a phrase such as “at least one of” or “one or more of” or “one or both of) indicates an inclusive list such that, for example, a list of at least one of A, B, or C means A or B or C or AB or AC or BC or ABC (i.e., A and B and C). Also, as used herein, the phrase “based on” shall not be construed as a reference to a closed set of conditions. For example, an example step that is described as “based on condition A” may be based on both a condition A and a condition B without departing from the scope of the present disclosure. In other words, as used herein, the phrase “based on” shall be construed in the same manner as the phrase “based at least in part on. Further, as used herein, including in the claims, a “set” may include one or more elements.

Some implementations of the method and apparatuses described herein may include means for receiving a first request message comprising a first set of parameters. The method and apparatuses described herein may include means for determining, based on the first set of parameters and a corresponding set of parameters stored in the UE, a mismatch of an SQN or a security key. The method and apparatuses described herein may include means for generating a synchronization identifier (ID) based on a device SQN. The method and apparatuses described herein may include means for transmitting a response message comprising at least an expected result based on a default ID of the UE, and the device SQN.

In some implementations of the method and apparatuses described herein may include means for transmitting a first request message comprising a first set of parameters. The method and apparatuses described herein may include means for receiving a response message comprising at least an indication of a mismatch of a SQN or a security key, and a device SQN. The method and apparatuses described herein may include means for generating a synchronization ID based on the device SQN. The method and apparatuses described herein may include means for determining an updated SQN based on the device SQN.

DETAILED DESCRIPTION

Figure 1:
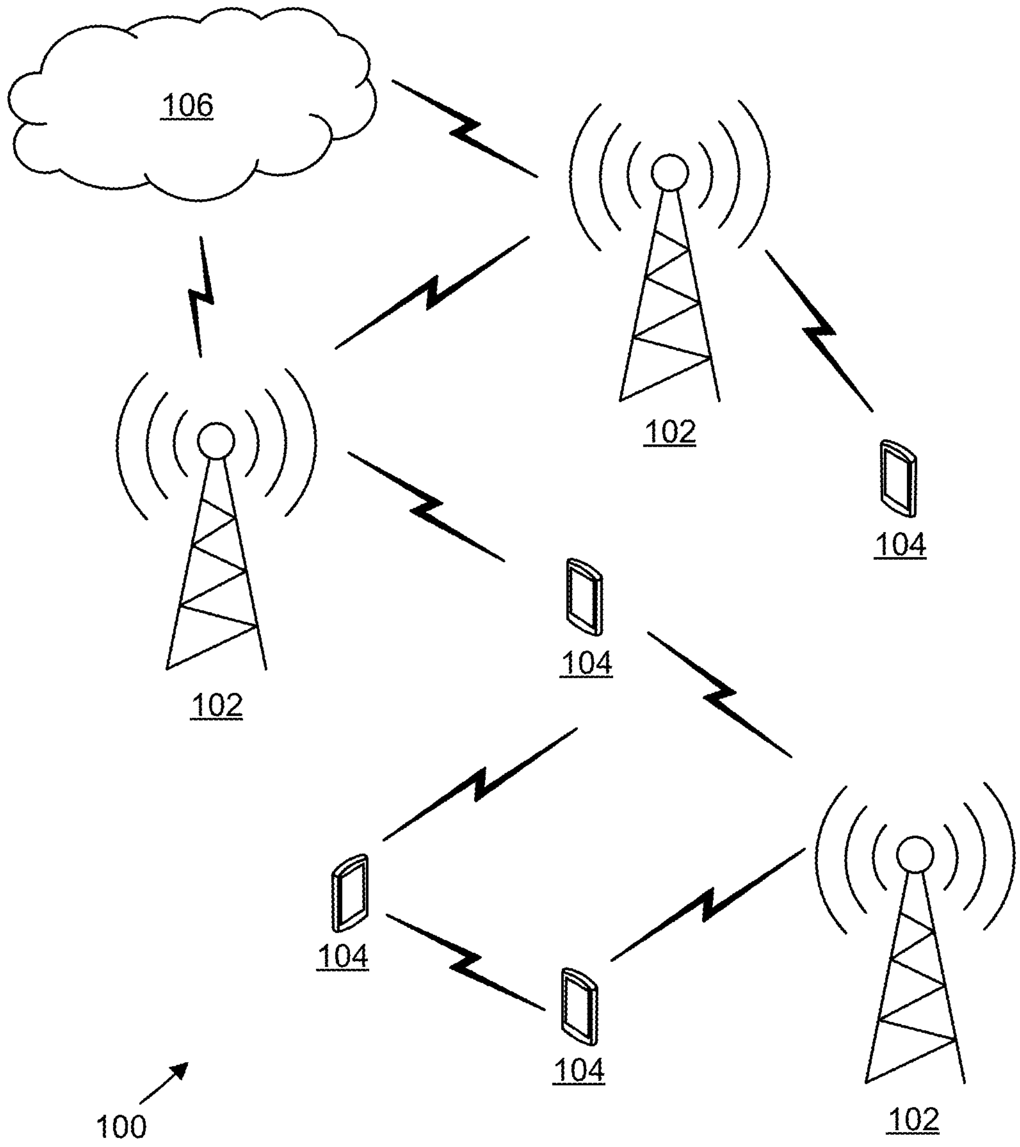
FIG. 1 illustrates an example of a wireless communication system in accordance with aspects of the present disclosure.

Some wireless communication systems may deploy IoT devices. As used herein, an IoT device may refer to a device that may be equipped with one or more sensors, actuators, gadgets, appliances, or machines. The IoT device may be programmed for specific applications and may transmit data over the Internet or other networks. IoT use cases include—amongst others—inventory, sensor data collection, asset tracking, and actuator control.

Ambient Internet-of-Things (AIoT) refers to an IoT technology suitable for deployment in a cellular telecommunication system for the very low-end IoT applications, where the AIoT device is an ultra-low complexity device with ultra-low power consumption. In various implementations, the energy of an AIoT device is provided only through the harvesting of radio waves, light, motion, heat, or any other suitable power source. Thus, an AIoT device may also be referred to as an "ambient power-enabled" IoT device.

Some AIoT devices may lack (e.g., not equipped with) an energy storage component, as well as lack independent signal generation capability (e.g., backscattering transmission). Some other AIoT devices may be equipped with an energy storage component, but may lack independent signal generation capability (e.g., backscattering transmission). These AIoT devices may support the use of stored energy to amplify reflected signals. Other AIoT devices may be equipped with an energy storage component, as well as support independent signal generation (e.g., via an active radio frequency (RF) component).

In a wireless communication system, AIoT devices may be part of different topologies and deployment scenarios. For instance, a topology may include a base station that functions (e.g., operates) as a reader node and as a source of a carrier wave. Another topology may include a base station that functions (e.g., operates) as a reader node, but another device is used as a source of the carrier wave. Yet another topology may include a base station that functions (e.g., operates) as a controller and another intermediate node (such as a UE) that is used as the reader node and as a source of a carrier wave.

Additionally, due to the requirements on low complexity, maintenance free and long life span (e.g., more than 10 years), small size and lower capabilities and lower power consumption than previously defined 3$^{rd}$ generation partnership project (3GPP) IoT devices, AIoT devices may not include a universal subscriber identity module (USIM), and thus may lack components and/or capabilities for secure communications between devices.

Consequently, the AIoT devices cannot utilize typical integrity protection schemes to protect their communications, e.g., due to limited computational and/or power capabilities of the AIoT devices. As such, the AIoT devices may utilize alternative techniques to achieve a desired level of communications security.

In some embodiments, the IoT devices (including AIoT devices and associated readers and servers) may generate secret parameters to integrity protect messages, as described in detail below. For example, an IoT device may use a hash-based function to generate a message authentication code for integrity (MAC-I) to protect unciphered contents of a message.

Relatedly, the IoT devices may also use the hash-based function to generate a temporary ID and an encryption key using the secret parameter and an SQN. Such techniques assume that the SQN stays synchronized between the transmitting device and the receiving device. However, synchronization issues between the transmitting and receiving devices prevent effective and secure communication.

However, there is presently no framework for re-synchronizing the temporary IDs used by the transmitting device and the receiving device, e.g., to resolve a mismatch of the temporary ID generation at the network and the Ambient IoT device. Accordingly, aspects of the present disclosure describe solutions the re-synchronization of the device and the network in case of any error in terms of key mismatch, temporary ID mismatch, or SQN mismatch.

While presented as distinct solutions, one or more of the solutions described herein may be implemented in combination with each other. Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies (RATs). In some implementations, the wireless communications system 100 may be a 4G network, such as an LTE network or an LTE-Advanced (LTE-A) network. In some other implementations, the wireless communications system 100 may be a new radio (NR) network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a wireless communication network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UE 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an internet-of-things (IoT) device, an internet-of-everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N2, or network interface). In some implementations, the NE 102 may communicate with each other directly. In some other implementations, the NE 102 may communicate with each other or indirectly (e.g., via the CN 106. In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N2, or another network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu$=0) may be associated with a first subcarrier spacing (e.g., 15 kHz) and a normal cyclic prefix. In some implementations, the first numerology (e.g., $\mu$=0) associated with the first subcarrier spacing (e.g., 15 kHz) may utilize one slot per subframe. A second numerology (e.g., $\mu$=1) may be associated with a second subcarrier spacing (e.g., 30 kHz) and a normal cyclic prefix. A third numerology (e.g., $\mu$=2) may be associated with a third subcarrier spacing (e.g., 60 kHz) and a normal cyclic prefix or an extended cyclic prefix. A fourth numerology (e.g., $\mu$=3) may be associated with a fourth subcarrier spacing (e.g., 120 kHz) and a normal cyclic prefix. A fifth numerology (e.g., $\mu$=4) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally, or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu$=0, $\mu$=1, $\mu$=2, $\mu$=3, $\mu$=4) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., orthogonal frequency division multiplexing (OFDM) symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu$=0) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., μ=0), which includes 15 kHz subcarrier spacing; a second numerology (e.g., μ=1), which includes 30 kHz subcarrier spacing; and a third numerology (e.g., μ=2), which includes 60 kHz subcarrier spacing. FR2 may be associated with one or multiple numerologies (e.g., at least 2 numerologies). For example, FR2 may be associated with a third numerology (e.g., μ=2), which includes 60 kHz subcarrier spacing; and a fourth numerology (e.g., μ=3), which includes 120 kHz subcarrier spacing.

In various embodiments, the NE 102 may comprise an IoT reader (or AIoT reader) and/or an IoT function (or AIoT function) configured to transmit commands to and receive results from an IoT device or AIoT device. In certain embodiments, the UE 104 may be the IoT device or the AIoT device (e.g., where the UE 104 lacks a USIM). In such embodiments, the UE 104 may receive (e.g., from the NE 102) a first request message that includes a first set of parameters and determine, based on the first set of parameters and a corresponding set of parameters stored in the UE 104, a mismatch of an SQN or a security key. In certain embodiments, the first set of parameters includes a first temporary ID, a first SQN, an encrypted nonce, an encrypted command, and a message authentication code for integrity (MAC-I). Upon receiving the first message, the UE 104 validates the MAC-I and the first temporary ID. After successfully validating the first message, the UE 104 may determine the mismatch of the SQN or the security key based on the first SQN or the encrypted nonce and command, or both.

In response to determining the mismatch of the SQN or the security key, the UE 104 generates a synchronization ID based on the SQN stored in the UE 104, which is referred to herein as the "device SQN." Further, the UE 104 may compute a result parameter based on a default ID of the UE 104 and a secret parameter known to the UE 104 and the NE 102. Additionally, to re-synchronize with the network, the UE 104 transmits (e.g., to the NE 102) a response message that includes at least the expected result and the device SQN. The response message may include an indication of the mismatch of the SQN or the security key.

Accordingly, the NE 102 (having transmitted the first request message) receives the response message containing an indication of a mismatch of a SQN or a security key, and a device SQN. The NE 102 uses the device SQN to generate a synchronization ID using the same process as the UE 104, therefore the NE 102 and the UE 104 independently generate the same synchronization ID. Additionally, the NE 102 determines an updated SQN based on the device SQN, thereby synchronizing with the UE 104. In certain embodiments, prior to synchronizing the SQN, the NE 102 may validate the UE 104 based on the result parameter and an expected result computed independently at the NE 102 using the shared secret parameter.

Figure 2:
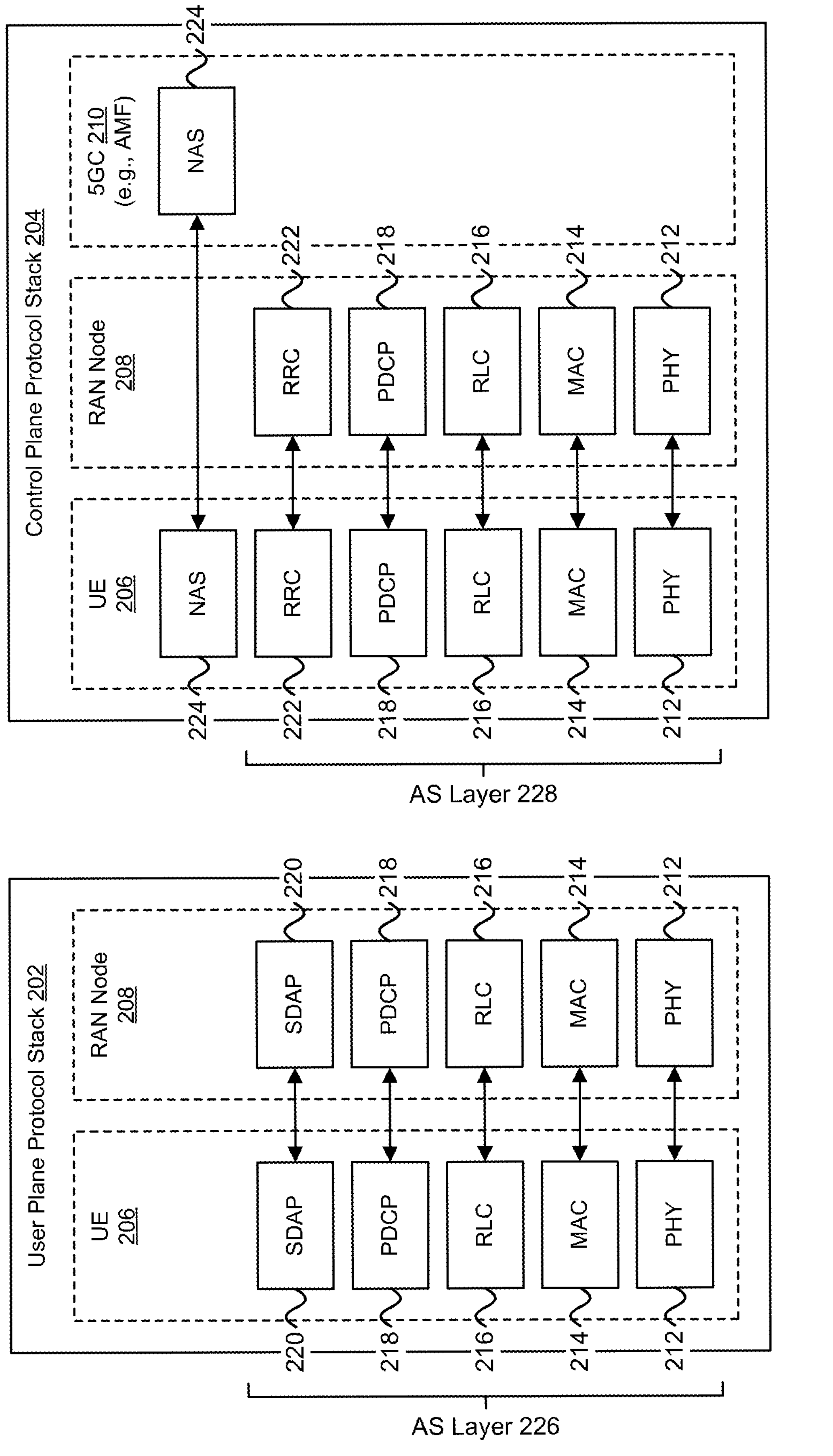
FIG. 2 illustrates an example of a protocol stack, in accordance with aspects of the present disclosure.

FIG. 2 illustrates an example of a protocol stack 200, in accordance with aspects of the present disclosure. While FIG. 2 shows a UE 206, a RAN node 208, and a 5GC 210 (e.g., comprising at least an AMF), these are representative of a set of UEs 104 interacting with an NE 102 (e.g., base station) and a CN 106. As depicted, the protocol stack 200 comprises a User Plane protocol stack 202 and a Control Plane protocol stack 204. The User Plane protocol stack 202 includes a PHY layer 212, a MAC sublayer 214, a Radio Link Control (RLC) sublayer 216, a Packet Data Convergence Protocol (PDCP) sublayer 218, and a Service Data Adaptation Protocol (SDAP) layer 220. The Control Plane protocol stack 204 includes a PHY layer 212, a MAC sublayer 214, a RLC sublayer 216, and a PDCP sublayer 218. The Control Plane protocol stack 204 also includes a Radio Resource Control (RRC) layer 222 and a Non-Access Stratum (NAS) layer 224.

The AS layer 226 (also referred to as "AS protocol stack") for the User Plane protocol stack 202 consists of at least SDAP, PDCP, RLC and MAC sublayers, and the physical layer. The AS layer 228 for the Control Plane protocol stack 204 consists of at least RRC, PDCP, RLC and MAC sublayers, and the physical layer. The Layer-1 (L1) includes the PHY layer 212. The Layer-2 (L2) is split into the SDAP sublayer 220, PDCP sublayer 218, RLC sublayer 216, and MAC sublayer 214. The Layer-3 (L3) includes the RRC layer 222 and the NAS layer 224 for the control plane and includes, e.g., an internet protocol (IP) layer and/or PDU Layer (not depicted) for the user plane. L1 and L2 are referred to as "lower layers," while L3 and above (e.g., transport layer, application layer) are referred to as "higher layers" or "upper layers."

The PHY layer 212 offers transport channels to the MAC sublayer 214. The PHY layer 212 may perform a beam failure detection procedure using energy detection thresholds, as described herein. In certain embodiments, the PHY layer 212 may send an indication of beam failure to a MAC entity at the MAC sublayer 214. The MAC sublayer 214 offers logical channels (LCHs) to the RLC sublayer 216. The RLC sublayer 216 offers RLC channels to the PDCP sublayer 218.

The PDCP sublayer 218 offers radio bearers to the SDAP sublayer 220 and/or RRC layer 222. The SDAP sublayer 220 offers QoS flows to the core network (e.g., 5GC). The RRC layer 222 provides for the addition, modification, and release of carrier aggregation (CA) and/or dual connectivity. The RRC layer 222 also manages the establishment, configuration, maintenance, and release of signaling radio bearers (SRBs) and data radio bearers (DRBs).

The NAS layer 224 is between the UE 206 and an AMF in the 5GC 210. NAS messages are passed transparently through the RAN. The NAS layer 224 is used to manage the establishment of communication sessions and for maintaining continuous communications with the UE 206 as it moves between different cells of the RAN. In contrast, the AS layers 226 and 228 are between the UE 206 and the RAN (i.e., RAN node 208) and carry information over the wireless portion of the network. While not depicted in FIG. 2, the IP layer exists above the NAS layer 224, a transport layer exists above the IP layer, and an application layer exists above the transport layer.

The MAC sublayer 214 is the lowest sublayer in the L2 architecture of the NR protocol stack. Its connection to the PHY layer 212 below is through transport channels, and the connection to the RLC sublayer 216 above is through LCHs. The MAC sublayer 214 therefore performs multiplexing and demultiplexing between LCHs and transport channels: the MAC sublayer 214 in the transmitting side constructs MAC PDUs (also known as Transport Blocks (TBs)) from MAC Service Data Units (SDUs) received through LCHs, and the MAC sublayer 214 in the receiving side recovers MAC SDUs from MAC PDUs received through transport channels.

The MAC sublayer 214 provides a data transfer service for the RLC sublayer 216 through LCHs, which are either control LCHs which carry control data (e.g., RRC signaling) or traffic LCHs which carry user plane data. On the other hand, the data from the MAC sublayer 214 is exchanged with the PHY layer 212 through transport channels, which are classified as uplink (UL) or downlink (DL). Data is multiplexed into transport channels depending on how it is transmitted over the air.

The PHY layer 212 is responsible for the actual transmission of data and control information via the air interface, i.e., the PHY layer 212 carries all information from the MAC transport channels over the air interface on the transmission side. Some of the important functions performed by the PHY layer 212 include coding and modulation, link adaptation (e.g., Adaptive Modulation and Coding (AMC)), power control, cell search and random access (for initial synchronization and handover purposes) and other measurements (inside the 3GPP system (i.e., NR and/or LTE system) and between systems) for the RRC layer 222. The PHY layer 212 performs transmissions based on transmission parameters, such as the modulation scheme, the coding rate (i.e., the modulation and coding scheme (MCS)), the number of Physical Resource Blocks (PRBs), etc.

In some embodiments, the protocol stack 200 may be an NR protocol stack used in a 5G NR system. In certain embodiments, the protocol stack 200 may lack the SDAP sublayer 220 in the AS layer 226, for example, where an EPC replaces the 5GC 210 and where the NAS layer 224 is between the UE 206 and an MME in the EPC. Note that the present disclosure distinguishes between a protocol layer (such as the aforementioned PHY layer 212, MAC sublayer 214, RLC sublayer 216, PDCP sublayer 218, SDAP sublayer 220, RRC layer 222 and NAS layer 224) and a transmission layer in Multiple-Input Multiple-Output (MIMO) communication (also referred to as a "MIMO layer" or a "data stream").

IoT has attracted much attention in the wireless communication world. More 'things' are expected to be interconnected for improving productivity efficiency and increasing comforts of life. Further reduction of size, complexity, and power consumption of IoT devices can enable the deployment of tens or even hundreds of billion IoT devices for various applications and provide added value across the entire value chain.

Most of the existing wireless communication devices are powered by batteries that need to be replaced or recharged manually. However, relying on battery power for IoT devices can be problematic as the batteries may require replacement or recharging manually, which leads to high maintenance cost, environmental issues, and even safety hazards for some use cases (e.g., wireless sensor in electric power and petroleum industry).

Ambient power-enabled internet-of-things (AIoT) devices are being studied to resolve the above problems with battery powered IoT devices. AIoT devices that consume very low power and rely on harvesting the energy are being studied and may include either battery-less devices or devices with limited energy storage capability (i.e., using a capacitor) and the energy is provided through the harvesting of radio waves, light, motion, heat, or any other power source that could be seen suitable. Some high-level agreements have been achieved regarding AIoT, e.g., on the transmission of carrier wave in and out of the agreed topologies, as well as some high-level design of DL and UL channels.

Considering the limited size and complexity required by practical applications for battery-less devices with no energy storage capability or devices with limited energy storage that do not need to be replaced or recharged manually, the output power of an energy harvester is typically from 1 μW to a few hundreds of μW. Existing cellular devices may not work well with energy harvesting due to their peak power consumption of higher than 10 mW.

An example type of application may include asset identification, which presently resorts mainly to barcode and radio frequency identification (RFID) in most industries. The main advantage of these two technologies is the ultra-low complexity and small form factor of the tags. However, the limited reading range of a few meters usually entails handheld scanning which leads to labor intensive and time-consuming operations, or RFID portals/gates which leads to costly deployments. Moreover, the lack of interference management scheme results in severe interference between RFID readers and capacity problems, especially in case of dense deployment. It is hard to support large-scale networks with seamless coverage for RFID.

Since existing technologies cannot meet all the requirements of target use cases, the AIoT technology offers low power consumption and support for numbers of connections and/or device densities that are orders of magnitude higher than conventional IoT technologies. The AIoT technology provides complexity and power consumption orders of magnitude lower than the existing 3GPP low power wide area (LPWA) technologies (e.g., narrowband IoT (NB-IoT) and enhanced MTC) to support use cases and scenarios that cannot otherwise be fulfilled based on existing 3GPP LPWA IoT technologies.

In one exemplary deployment scenario, an AIoT device communicates directly and bidirectionally with a base station (e.g., an AIoT reader) that serves a micro cell. The communication link between the base station and the AIoT device is used to transfer AIoT data and/or signaling. In one embodiment of this deployment scenario, both the base station and the AIoT device may be located indoors. Furthermore, the base station may be co-sited with one or more RAN nodes of other 3GPP technologies.

In another exemplary deployment scenario, an AIoT device may communicate bidirectionally with an intermediate node (such as a UE) between the AIoT device and a base station that serves a macro cell. The communication link between the AIoT device and the intermediate node is used to transfer AIoT data and/or signaling, while the communication link between the intermediate node and the base station is used to relay the AIoT data and/or signaling. The intermediate node is a relay device located between the AIoT device and the RAN. In one embodiment of this deployment scenario, the intermediate node may be a UE, and may be located in the same environment (e.g., indoors) as the AIoT device.

In one embodiment, the intermediate node may function as a relay node between the base station and the AIoT device. In another embodiment, the intermediate node may function as an interrogator between the base station and the AIoT device, where the intermediate node receives a service request from an AIoT client and initiates an AIoT service procedure with the AIoT device in response to the request. In certain embodiments of the second deployment scenario, the base station may be located outdoors, while both the intermediate node and the AIoT device may be located indoors. Furthermore, the base station may be co-sited with one or more RAN nodes of other 3GPP technologies.

Decoding a backscattered signal at the base station (or intermediate node) depends on various factors, such as a distance between the AIoT device and the base station (or intermediate node), a transmit power and a distance between an emitter or an intermediate node and the AIoT UE, a channel for both links, one or more hardware characteristics of the AIoT device including different types of losses within circuitry of the AIoT device, as well as other factors such as modulation and coding schemes for modulating and encoding the backscattered signal, or a combination thereof. For mobile AIoT devices, the quality of a backscattering signal varies according to the distance, channel conditions, blockages, or a combination thereof.

Considering the fact that AIoT devices are assumed to be ultra-low complexity devices with ultra-low power consumption for the very low-end IoT applications, the radio protocol architecture for AIoT needs to be compact compared to the architecture as specified for NR. In some embodiments, the protocol stack for AIoT includes a PHY layer, a data link control (DLC) layer, and an RRC layer. In certain embodiments, the protocol stack consists solely of the PHY layer, the DLC layer, and the RRC layer.

For the AIoT radio protocol architecture, the main functions of each layer/sublayer include the following: The main functions of the RRC layer include the broadcast of system information, paging, RRC connection control, and AS security. The main functions of the DLC layer include the transfer of data (i.e., user plane and/or control plane), ciphering, integrity protection, multiplexing of MAC SDUs belonging to one or different logical channels into TBs delivered to PHY layer. The main functions of the PHY layer include the channel coding, error detection, modulation, frequency and time synchronization, and measurements.

To ensure that messages are received from known/trusted devices, thereby preventing man-in-the-middle types of cyberattacks, IoT devices (including AIoT devices) may perform integrity protection and append a MAC-I to messages. The MAC-I is a unique code (e.g., parameter) based on the message contents and a unique secret parameter (e.g., secret key). The MAC-I is used to verify the integrity and authenticity of a message, i.e., confirm that the message contents have not been altered during transmission (or relay) and that the message originated from a trusted source.

For example, upon generating a message, the sending device used a shared secret parameter (i.e., known to the sender and recipient(s), but otherwise kept confidential) and the message contents to generate the MAC-I, e.g., using a hash-based function. The sending device appends the MAC-I to the message and sends the message and MAC-I to the receiving device. Upon receiving the message with MAC-I, the receiving device uses the same shared secret parameter (e.g., shared key) to compute its own version of the MAC-I based on the message contents. If the two MAC-I versions (i.e., the received version and the generated version) match, then the receiving device has verified that the message was not modified in transit (i.e., integrity verification) and that the message was generated by a trusted source (i.e., authenticity verification).

Described herein are solutions to various scenarios for re-synchronization of security parameters between the IoT network and an IoT UE.

In a first aspect, a registration procedure of an AIoT UE and subsequent communications with the AIoT UE may be enhanced by the introduction of a sequence number (SQN) to recognize message mismatches. In various embodiments, the SQN is independently maintained in the device and the network. In some embodiments, the SQN may be counted separately for DL and UL.

In a second aspect, the registration procedure of an AIoT UE and subsequent communications with the AIoT UE may be enhanced by the introduction of a MAC-I to protect the unciphered parameters, such as a temporary ID and the SQN.

In a third aspect, a re-synchronization procedure is described to resolve the case of an SQN mismatch or a key mismatch. Details on message format, key derivation, temporary ID generation and proof generation are described below. While presented as distinct solutions, one or more of the aspects described in the present application may be implemented in combination with each other.

Figure 3A:
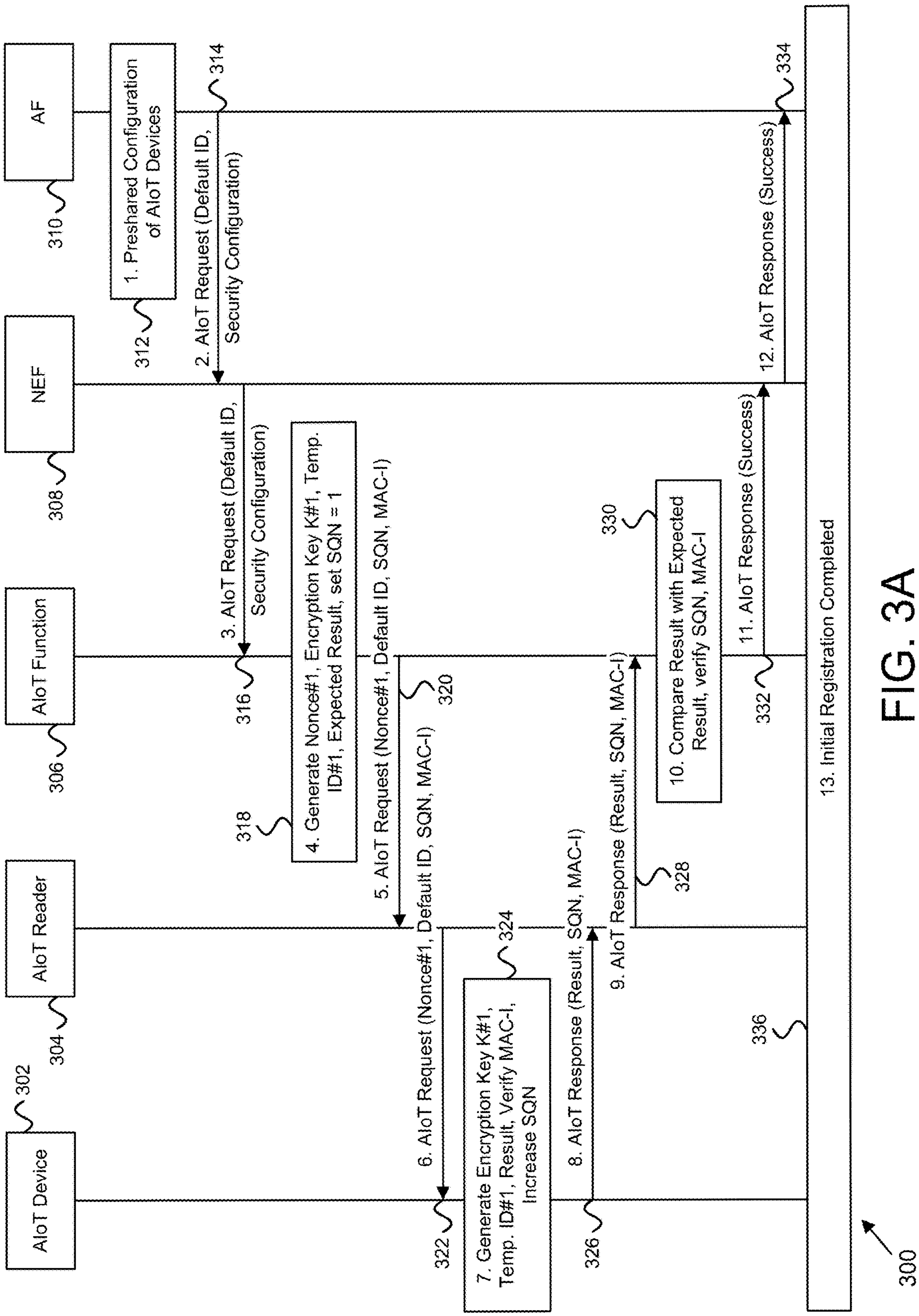
FIG. 3A illustrates an example of a procedure for the initial registration of an IoT device and subsequent IoT communications, in accordance with aspects of the present disclosure.
Figure 3B:
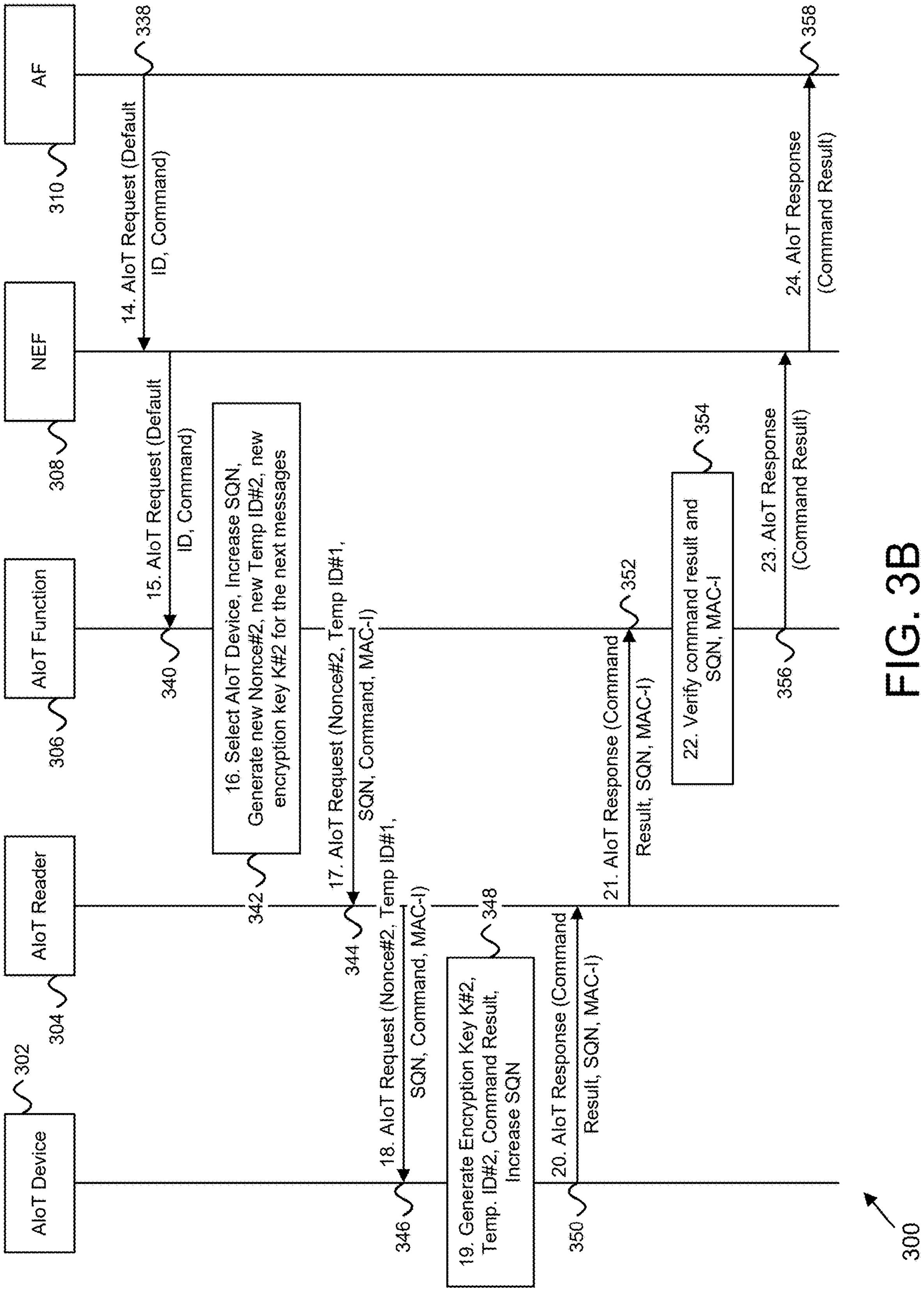
FIG. 3B is a continuation of the procedure of FIG. 3A.

FIG. 3A and FIG. 3B illustrate a procedure 300 for the initial registration of an IoT device (e.g., an AIoT UE) and subsequent IoT communications, in accordance with aspects of the present disclosure. Steps 1-13 correspond to an initial registration phase, while steps 14-24 correspond to a command phase during which parameter synchronization is maintained. While FIGS. 3A-3B are described in the context of AIoT devices and associated readers and servers, the techniques described herein are also applicable to more IoT devices (i.e., having increased computational and/or power capabilities as compared to an AIoT device) and their associated readers and servers.

The procedure 300 involves an AIoT device 302, and AIoT reader 304, an AIoT function 306, a network exposure function (NEF) 308, and an application function (AF) 310. The AIoT device 302 may be an implementation of the UE 104. The AIoT reader 304 (also known as an interrogator) may be an implementation of the NE 102 and/or a base station that functions (e.g., operates) as a reader node. Alternatively, the AIoT reader 304 may be an intermediate node, such as a UE.

The AIoT function 306 may be an implementation of a support or interworking function in the CN 106 for communicating with the AIoT reader 304 and the AIoT devices 302. The NEF 308 is a network function in the CN 106 that provides application programming interfaces (APIs) that expose network capabilities to external IoT applications, e.g., to provide IoT service integration and device management. The AF 310 is a network node that provides IoT application services and may interact with external applications or servers. In one example, the AF 310 is an IoT application server that interfaces with the AIoT devices 302 via the NEF 308. In certain embodiments, the AF 310 may host one or more IoT applications that utilize data from AIoT devices 302, and thus interacts with the network to retrieve, process, and respond to IoT data.

At step 1, the AF 310 has a pre-shared configuration of the AIoT devices, which includes a unique default ID of the AIoT device 302 and respective security parameters for deriving a security key and temporary IDs for ID privacy (see signaling 312).

The respective security parameters may comprise a shared secret, which may be a secret key, a secret parameter, a password, a passphrase, etc. The shared secret is only known to the AIoT device 302 and the AF 310.

At step 2, the AF 310 sends an AIoT request to the NEF 308 with the default ID and the security parameters of the AIoT device 302 (see signaling 314).

At step 3, the NEF 308 forwards the AIoT request to the selected AIoT function 306 (see signaling 316). Accordingly, the AIoT function 306 now shares the shared secret with the AIoT device 302 and is able to securely communicate with the AIoT device.

At step 4, the AIoT function 306 generates a nonce (i.e., Nonce #1) and uses it to derive an encryption key (i.e., key K #1) and a temporary ID (i.e., ID #1) based on the security context received from the NEF 308 (see block 318). The nonce (i.e., number used once) is an arbitrary number and may be a random (or pseudo-random) number which is used only for one generation of the temporary ID, encryption key, MAC-I, or result computations in the AIoT function 306 and the AIoT device 302. In certain embodiments, the nonce may be a token, such as a unique token, a random token, or a single-use token.

In some embodiments, the encryption key and the temporary ID are computed as described below with reference to FIG. 5. The AIoT function 306 uses the encryption key K #1 to calculate an expected result as a proof of the default ID of the AIoT device 302. In some embodiments, the expected result is computed as described below with reference to FIG. 6. Also, the AIoT function 306 also sets the sequence number (SQN) to "1".

Further, the AIoT function 306 generates a request message comprising the nonce (i.e., unencrypted), the default ID of the AIoT device 302, and the SQN (i.e., set to '1' for the initial message), and then protects this message with a MAC-I. The MAC-I generation is described below with reference to FIG. 7. Note that the AIoT function 306 uses the default ID to address (i.e., page) the AIoT device 302 prior to completing the initial registration.

At step 5, the AIoT function 306 sends an AIoT request to the AIoT reader 304 (see signaling 320). Here, the AIoT request includes the default ID, the nonce (i.e., Nonce #1), the SQN and the MAC-I. Note that the AIoT request does not include the encryption key (i.e., key K #1), the temporary ID (i.e., ID #1), or the expected result generated during step 4.

At step 6, the AIoT reader 304 sends the AIoT request to the AIoT device 302, which is listening to requests with the default ID for initial onboarding to the AIoT network (see signaling 322).

At step 7, the AIoT device 302 verifies the MAC-I and the expected SQN (see block 324). Upon successful verification, the AIoT device 302 calculates the encryption key (i.e., key K #1) and the temporary ID (i.e., ID #1) for the next usage in a similar way to the AIoT function 306, e.g., as described below with reference to FIG. 5. The AIoT device 302 computes the result as a proof that it holds the security context, i.e., the AIoT device 302 calculates a proof of the default ID. In some embodiments, the result is computed as described below with reference to FIG. 6.

Figure 7:
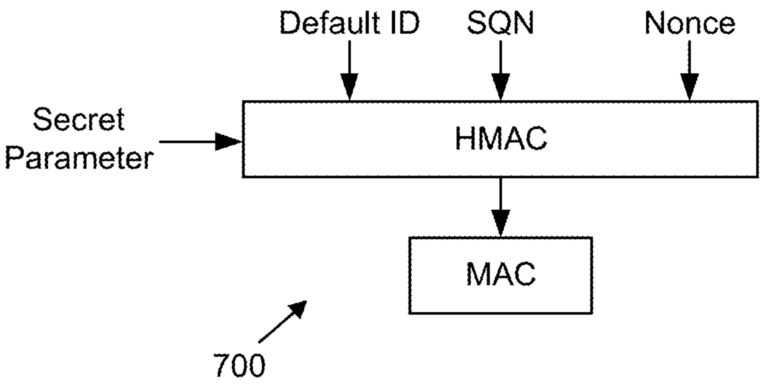
FIG. 7 illustrates an example of an indication procedure for LPP capability exchange, in accordance with aspects of the present disclosure.

During step 7, the AIoT device 302 increases the SQN and generates a response message comprising the calculated result (i.e., proof of default ID) and the updated SQN (i.e., increased from the received value), and then protects this message with a MAC-I in a similar way as shown in FIG. 7; however, here the computed result (i.e., proof of default ID) is used as an input to the hash-based message authentication code (HMAC) function instead of the nonce. After generating the response message, the temporary ID #1, and the encryption key K #1, the AIoT device 302 will now listen for paging with the temporary ID #1 and expects the payload to be encrypted with the encryption key K #1.

At step 8, the AIoT device 302 sends an AIoT response to the AIoT reader 304, including the computed result, SQN, and MAC-I (see signaling 326).

At step 9, the AIoT reader 304 forwards the AIoT response to the AIoT function 306 (see signaling 328).

At step 10, the AIoT function 306 verifies the MAC-I and the expected SQN. Upon successful verification, the AIoT function 306 compares the received result with the expected result and authenticates the AIoT device 302 if the received result is identical to (i.e., matches) the expected result (see block 330).

At step 11, the AIoT function 306 sends an AIoT response to the NEF 308, indicating the success of the authentication (see signaling 332).

At step 12, the NEF 308 forwards the AIoT response to the AF 310 (see signaling 334).

At step 13, the initial registration with the setup of the security association and authentication is completed (see block 336).

All further requests from the AF 310 are then encrypted by the AIoT function 306 and the AIoT device 302. Also, the AIoT device 302 is addressed (i.e., paged) by the temporary ID only. The AIoT function 306 may change (i.e., update) the encryption key and the temporary ID by providing a new nonce in a protected downlink request.

Continuing at FIG. 3B, step 14, the AF 310 sends an AIoT request to the NEF 308 (see signaling 338). Here, the AIoT request includes the default ID of the AIoT device 302 and a command request. In various embodiments, the command request comprises a set of command parameters that describe the requested AIoT command.

At step 15, the NEF 308 forwards the AIoT request to the selected AIoT function 306 (see signaling 340).

At step 16, the AIoT function 306 increases the SQN before using it for the temporary ID and encryption key generation (see block 342). Additionally, the AIoT function 306 selects the device context based on the default ID and generates a new nonce (i.e., Nonce #2), the AIoT function 306 then uses the new nonce to derive a new encryption key (i.e., key K #2) and a new temporary ID (i.e., ID #2), which will be later activated when the AIoT function 306 receives a reply to the request with the temporary ID #1. The temporary ID and encryption key generation may be as described below with reference to FIG. 5.

Further, the AIoT function 306 uses the previously generated encryption key K #1 to encrypt the new Nonce #2 and the command request. The AIoT function 306 generates a request message comprising the command request (i.e., encrypted), the new nonce (i.e., encrypted), the temporary ID #1, and the updated SQN (i.e., increased from the previously transmitted value), and then protects this message with a MAC-I. Note that the AIoT function 306 uses the previously generated temporary ID #1 to address the AIoT device 302.

At step 17, the AIoT function 306 sends an AIoT request to the AIoT reader 304 (see signaling 344). Here, the AIoT request includes the temporary ID #1, the Nonce #2, the SQN, the command request, and the MAC-I.

At step 18, the AIoT reader 304 sends the AIoT request to the AIoT device 302, which is listening to requests with the temporary ID #1 (see signaling 346).

At step 19, the AIoT device 302 verifies the received MAC-I and the expected SQN. After successful verification, the AIoT device 302 deciphers the Nonce #2 and the AIoT request payload (i.e., command request) and then calculates the new encryption key K #2 and the new temporary ID #2 for the next usage, e.g., in a similar way as the AIoT function 306 (see block 348). The AIoT device 302 executes the command from the AF 310. The AIoT device 302 increases the SQN and uses the previously generated encryption key K #1 to encrypt the command result.

The AIoT device 302 generates a response message comprising the command result (i.e., response payload) and the updated SQN (i.e., increased from the received value), and then protects the message with a MAC-I. After generating the response message, the temporary ID #2, and the encryption key K #2, the AIoT device 302 will now listen for paging with the temporary ID #2 and expects the payload to be encrypted with the encryption key K #2.

At step 20, the AIoT device 302 sends an AIoT response to the AIoT reader 304 (see signaling 350). Here, the AIoT response includes the command result, the SQN, and the MAC-I.

At step 21, the AIoT reader 304 forwards the AIoT response to the AIoT function 306 (see signaling 352).

At step 22, the AIoT function 306 verifies the received MAC-I and the expected SQN (see block 354). The AIoT function 306 decrypts the command result with the encryption key K #1 before forwarding towards the AF 310. For the next message, the AIoT function 306 activates the encryption key K #2 and the temporary ID #2, increases the SQN, and generates a new Nonce #3, a new temporary ID #3, and a new encryption key K #3.

At step 23, the AIoT function 306 sends an AIoT response to the NEF 308, including the deciphered (i.e., decrypted) result of the command request (see signaling 356).

At step 24, the NEF 308 forwards the AIoT response to the AF 310 (see signaling 358).

Figure 4A:
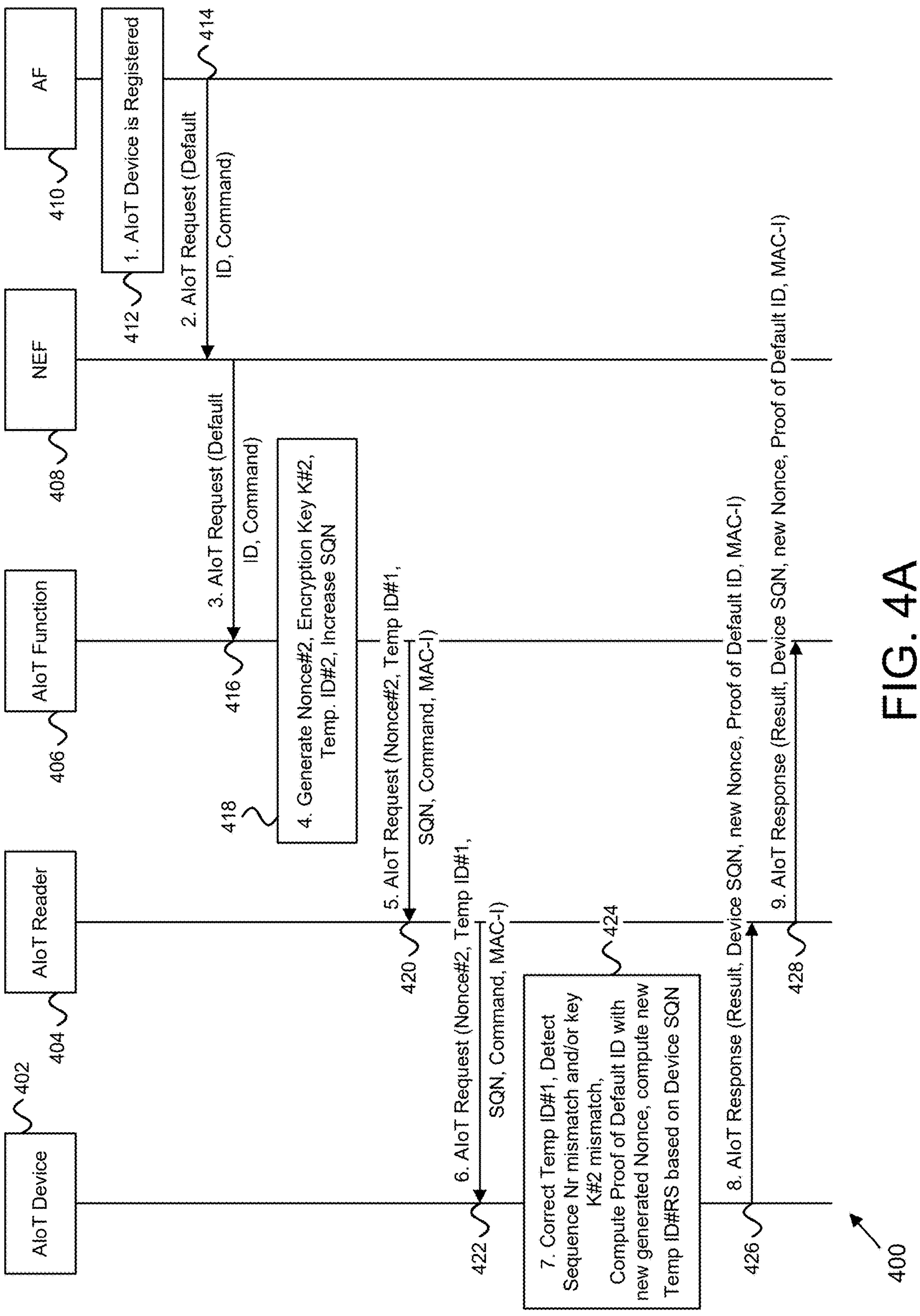
FIG. 4A illustrates an example of a procedure for re-synchronization in case of key or SQN mismatch, in accordance with aspects of the present disclosure.
Figure 4B:
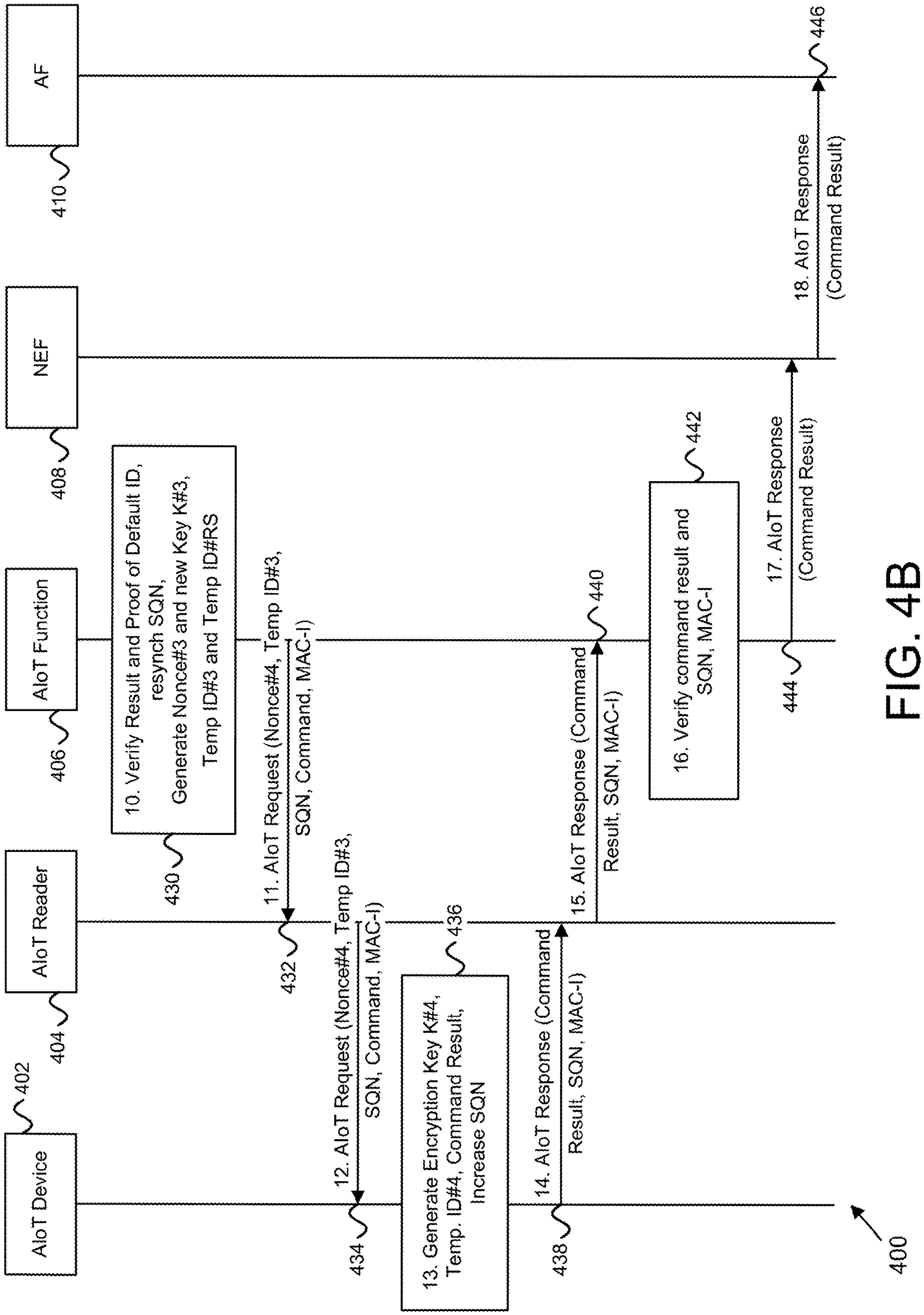
FIG. 4B is a continuation of the procedure of FIG. 4A.

FIGS. 4A and 4B illustrate a procedure 400 for the re-synchronization in case of key or sequence number (SQN) mismatch, in accordance with aspects of the present disclosure. While FIGS. 4A-4B are described in the context of AIoT devices and associated readers and servers, the techniques described herein are also applicable to more IoT devices (i.e., having increased computational and/or power capabilities as compared to an AIoT device) and their associated readers and servers.

The procedure 400 involves an AIoT device 402, and AIoT reader 404, an AIoT function 406, an NEF 408, and an AF 410. The AIoT device 402 may be an implementation of the UE 104 and/or the AIoT device 302. The AIoT reader 404 (also known as an interrogator) may be an implementation of the NE 102, the AIoT reader 304 and/or a base station that functions (e.g., operates) as a reader node. Alternatively, the AIoT reader 404 may be an intermediate node, such as a UE.

The AIoT function 406 may be an implementation of the AIoT function 306 and/or a support or interworking function in the CN 106 for communicating with the AIoT reader 404 and the AIoT devices 402. The NEF 308 may be an implementation of the NEF 308 and provides APIs that expose network capabilities to external IoT applications. The AF 410 may be an implementation of the AF 310 and provides IoT application.

At step 1, the AIoT device 402 is registered with the AF 410 and the AIoT network (see block 412). In various embodiments, the AIoT device 402 performs initial registration (e.g., according to the steps 1-13 of FIG. 3A) and generates a first encryption key (i.e., key K #1) and a first temporary ID (i.e., ID #1) for paging.

At step 2, the AF 410 sends an AIoT request to the NEF 408 with the default ID of the AIoT device 402 and a command request (see signaling 414). In various embodiments, the command request comprises a set of command parameters that describe the requested AIoT command.

At step 3, the NEF 408 forwards the AIoT request to the selected AIoT function 406 (see signaling 416).

At step 4, the AIoT function 406 increases the SQN before using it for the temporary ID and encryption key generation (see block 418). Additionally, the AIoT function 406 selects the device context based on the default ID and generates a new nonce (i.e., Nonce #2) and uses this new nonce to derive a new encryption key (i.e., key K #2) and a new temporary ID (i.e., ID #2), which are activated when the AIoT function 406 receives a reply to the request with the temporary ID #1. The temporary ID and encryption key generation may be as described below with reference to FIG. 5.

Further, the AIoT function 406 uses the previously generated encryption key K #1 to encrypt the new Nonce #2 and the command message. The AIoT function 406 generates a request message comprising the command message (i.e., encrypted), the new Nonce #2 (i.e., encrypted), the temporary ID #1, and the updated SQN (i.e., increased from a previously transmitted value), and then protects this message with a MAC-I. Note that the AIoT function 406 uses the previously generated temporary ID #1 to address the AIoT device 402.

At step 5, the AIoT function 406 sends an AIoT request to the AIoT reader 404 (see signaling 420). Here, the AIoT request includes the temporary ID #1, the Nonce #2, the SQN, the command message, and the MAC-I.

At step 6, the AIoT reader 404 sends the AIoT request to the AIoT device 402, which is listening to requests with the temporary ID #1 (see signaling 422).

At step 7, the AIoT device 402 verifies the MAC-I and the expected SQN. However, after successful verification, the AIoT device 402 detects an SQN mismatch and/or a key mismatch (see block 424). In one embodiment, the AIoT device 402 detects the SQN/key mismatch when it cannot decrypt the Nonce #2 or the command message.

The AIoT device 402 generates a new nonce and computes a proof of the default ID using the device-generated nonce. Note that nonce generation is typically a network behavior, and the AIoT device does not generate a nonce when the SQN and encryption keys are synchronized because the AIoT device 402 is able to decipher the encrypted nonce received from the AIoT network. The generating of the proof of the default ID (i.e., security context proof) is described below with reference to FIG. 6.

Additionally, the AIoT device 402 computes a re-synchronization ID (also referred to as a "synchronization ID") and a re-synchronization encryption key K #RS (also referred to as a "synchronization key") using the current device SQN and the device-generated nonce as inputs. The re-synchronization ID is a temporary ID used to synchronize the SQN with the network and is computed similar to the temporary ID (refer to FIG. 5 for ID and key generation). The encryption key K #RS is used to protect the next nonce generated by the AIoT function 406, i.e., in the next message from the AIoT function 406.

Further, the AIoT device 302 generates a response message comprising the current device SQN, the device-generated nonce, the proof of the default ID, and a command result (i.e., response payload) comprising a "key or SQN mismatch" indication. The AIoT device 402 then protects this message with a MAC-I (refer to FIG. 9 for the MAC-I generation). After generating the response message, the re-synchronization ID, and the re-synchronization encryption key K #RS, the AIoT device 302 will now listen for paging with the re-synchronization ID and expects the payload to be encrypted with the encryption key K #RS.

At step 8, the AIoT device 402 sends an AIoT response to the AIoT reader 404 (see signaling 426). Here, the AIoT response includes the current device SQN, the device-generated nonce, the command result (i.e., mismatch indication), the proof of the default ID, and the MAC-I.

At step 9, the AIoT reader 404 forwards the AIoT response to the AIoT function 406 (see signaling 428).

At step 10, the AIoT function 406 verifies the received MAC-I and determines that the command result indicates the Key or SQN mismatch (see block 430). The AIoT function 406 verifies the proof of the default ID and re-synchronizes the network SQN to the value of the device SQN.

Additionally, the AIoT function 406 uses the device-generated nonce to compute the temporary re-synchronization ID #RS and then increases the SQN and generates a new Nonce #3 to derive a new encryption key K #3 and a new temporary ID #3. The AIoT function 406 deletes the previously generated encryption key K #2 and a new temporary ID #2 from step 4.

The AIoT function 406 uses the previously generated encryption key K #RS to encrypt the new Nonce #3, and the command message previously received from the AF 410. The AIoT device 402 generates a request message comprising the encrypted command message (i.e., request payload) and the updated SQN (i.e., increased from the received value), and then protects the message with a MAC-I. The AIoT function 406 uses the previously generated temporary ID #RS to address the AIoT device 402.

At step 11, the AIoT function 406 sends an AIoT request to the AIoT reader 404 (see signaling 432). Here, the AIoT request includes the temporary ID #RS, the Nonce #3, the SQN, the command message, and the MAC-I.

At step 12, the AIoT reader 404 sends the AIoT request to the AIoT device 402, which is listening to requests with the temporary ID #RS (see signaling 434).

At step 13, the AIoT device 402 verifies the received MAC-I and the expected SQN. After successful verification, the AIoT device 402 deciphers the Nonce #3 and the AIoT request payload (i.e., command message) and then calculates the new encryption key K #3 and the new temporary ID #3 for the next usage, e.g., in a similar way as the AIoT function 406. The AIoT device 402 executes the command from the AF 410 (see block 436).

The AIoT device 402 executes the command from the AF 410. The AIoT device 402 increases the SQN and uses the previously generated encryption key K #RS to encrypt the command result. The AIoT device 402 generates a response message comprising the command result (i.e., response payload) and the updated SQN (i.e., increased from the received value), and then protects the message with a MAC-I. After generating the response message, the temporary ID #3, and the encryption key K #3, the AIoT device 302 will now listen for paging with the temporary ID #3 and expects the payload to be encrypted with the encryption key K #3.

At step 14, the AIoT device 402 sends an AIoT response to the AIoT reader 404 (see signaling 438). Here, the AIoT response includes the command result, the SQN, and the MAC-I.

At step 15, the AIoT reader 404 forwards the AIoT response to the AIoT function 406 (see signaling 440).

At step 16, the AIoT function 406 verifies the received MAC-I and the expected SQN (see block 442). The AIoT function 406 decrypts the command result with the encryption key K #RS before forwarding towards the AF 410. For the next message, the AIoT function 406 activates the encryption key K #3 and the temporary ID #3, increases the SQN, and generates a new Nonce #4, a new temporary ID #4, and a new encryption key K #4.

At step 17, the AIoT function 406 sends an AIoT response to the NEF 408, including the result of the command request (see signaling 444).

At step 18, the NEF 408 forwards the AIoT response to the AF 410 (see signaling 446).

Figure 5:
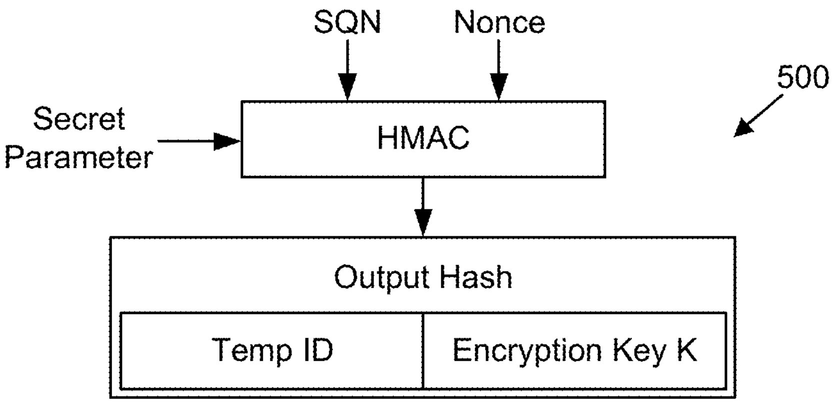
FIG. 5 illustrates an example of temporary ID and encryption key generation, in accordance with aspects of the present disclosure.

FIG. 5 illustrates an example 500 of temporary ID and encryption key generation, in accordance with aspects of the present disclosure. In various embodiments, a new temporary ID and a new encryption key K are generated when an AIoT message is received and validated, as shown in FIGS. 3A-3B and 4A-4B. The AIoT devices 302, 402 and the AIoT functions 306, 406 may generate the temporary ID and encryption key in the same manner.

In the depicted example, the temporary ID and the encryption key K are generated using a hash-based message authentication code (HMAC) function, where the secret parameter, the SQN, and the nonce are input to the HMAC function. The output of the HMAC function comprises the temporary ID and the encryption key K in concatenated form.

In one embodiment, the split of the temporary ID and the encryption key K may be equal, i.e., the key length and the temporary ID length are the same. In other embodiments, the length of the encryption key K and the temporary ID length may be different. In one embodiment, the temporary ID may be formed from the most significant bits of the output hash, and the encryption key is formed from the remaining bits. In another embodiment, the temporary ID may be formed from the least significant bits of the output hash, and the encryption key is formed from the remaining bits.

Figure 6:
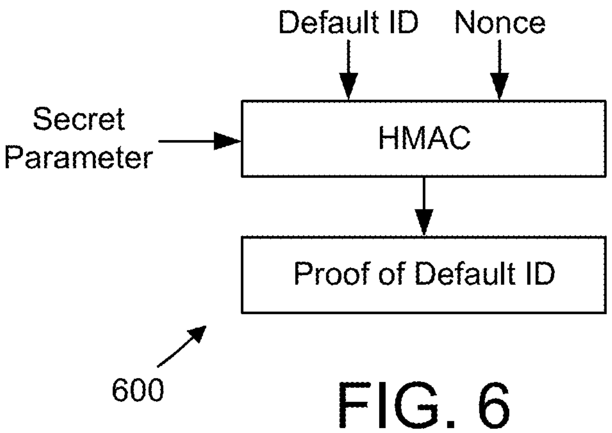
FIG. 6 illustrates an example of a transfer procedure for long term evolution (LTE) positioning protocol (LPP) capability exchange, in accordance with aspects of the present disclosure.

FIG. 6 illustrates an example 600 of expected result generation, in accordance with aspects of the present disclosure. In various embodiments, the expected result is a security context proof (also referred to as proof of the default ID).

In the depicted example, the expected result is generated using a HMAC function, where the secret parameter, the default ID, and the nonce are input to the HMAC function. The output of the HMAC function comprises the proof of the default ID, i.e., the proof that the device holds security context containing the default ID.

FIG. 7 illustrates an example 700 of initial MAC-I generation (e.g., for an AIoT message that lacks a payload), in accordance with aspects of the present disclosure. In various embodiments, the AIoT Function computes a MAC-I over the payload-less message, i.e., using the inputs default ID, nonce and SQN.

In the depicted example, the expected result is generated using a HMAC function, where the secret parameter, the default ID, the SQN and the nonce are input to the HMAC function. The output of the HMAC function comprises the MAC-I.

Figure 8:
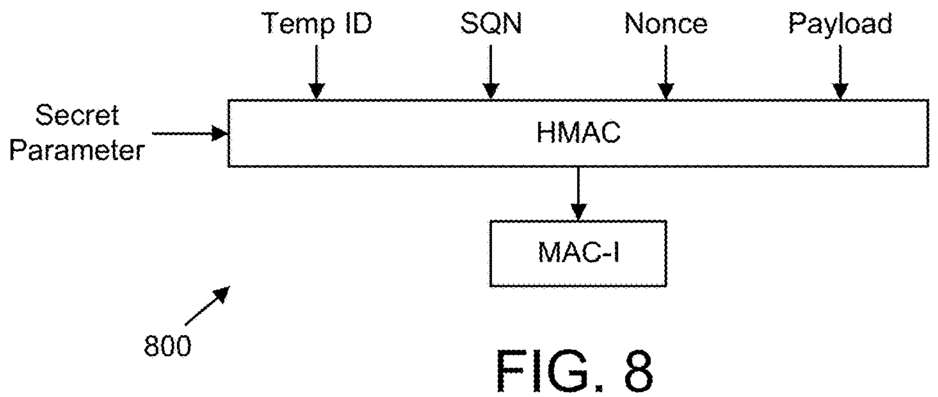
FIG. 8 illustrates an example of a mapping structure of an associated identifier (ID) to information relating to UE and network conditions and applicable functionalities, in accordance with aspects of the present disclosure.

FIG. 8 illustrates an example 800 of MAC-I generation for messages, in accordance with aspects of the present disclosure. In various embodiments, the AIoT Function computes a MAC-I over the full message, i.e., using the inputs default ID, nonce and SQN.

In the depicted example, the expected result is generated using a HMAC function, where the secret parameter, the default ID, the SQN and the nonce are input to the HMAC function. The output of the HMAC function comprises the MAC-I.

Figure 9:
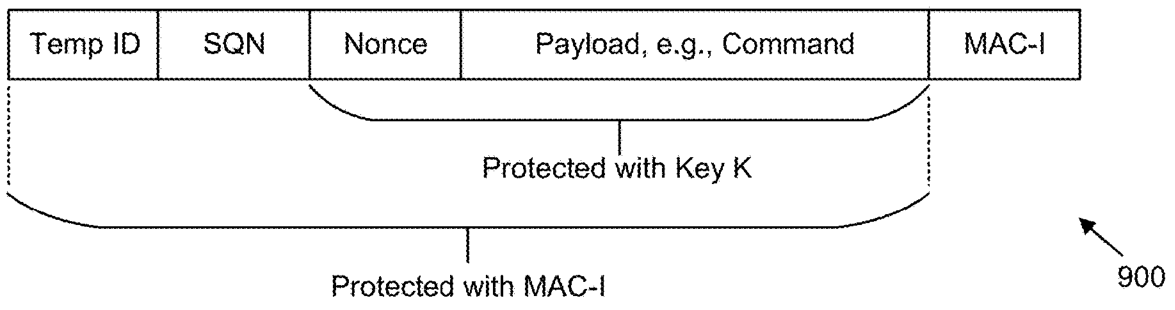
FIG. 9 illustrates an example of a nesting structure of associated IDs and corresponding sub-items, in accordance with aspects of the present disclosure.

FIG. 9 illustrates an example 900 of message protection for AIoT communication, in accordance with aspects of the present disclosure. In some embodiments, the message protection may include encryption of the payload (e.g., command request/result, when present) and one or more parameters, such as the nonce. As described above, the encryption key associated with a temporary ID may be used to encrypt the payload and nonce.

Additionally, the message contents may be protected with a MAC-I. In the depicted example, the AIoT message includes a temporary ID, a SQN, a nonce (i.e., encrypted) and a payload (i.e., an encrypted command message), all of which are protected by the MAC-I. The MAC-I is also appended to the AIoT message.

Figure 10:
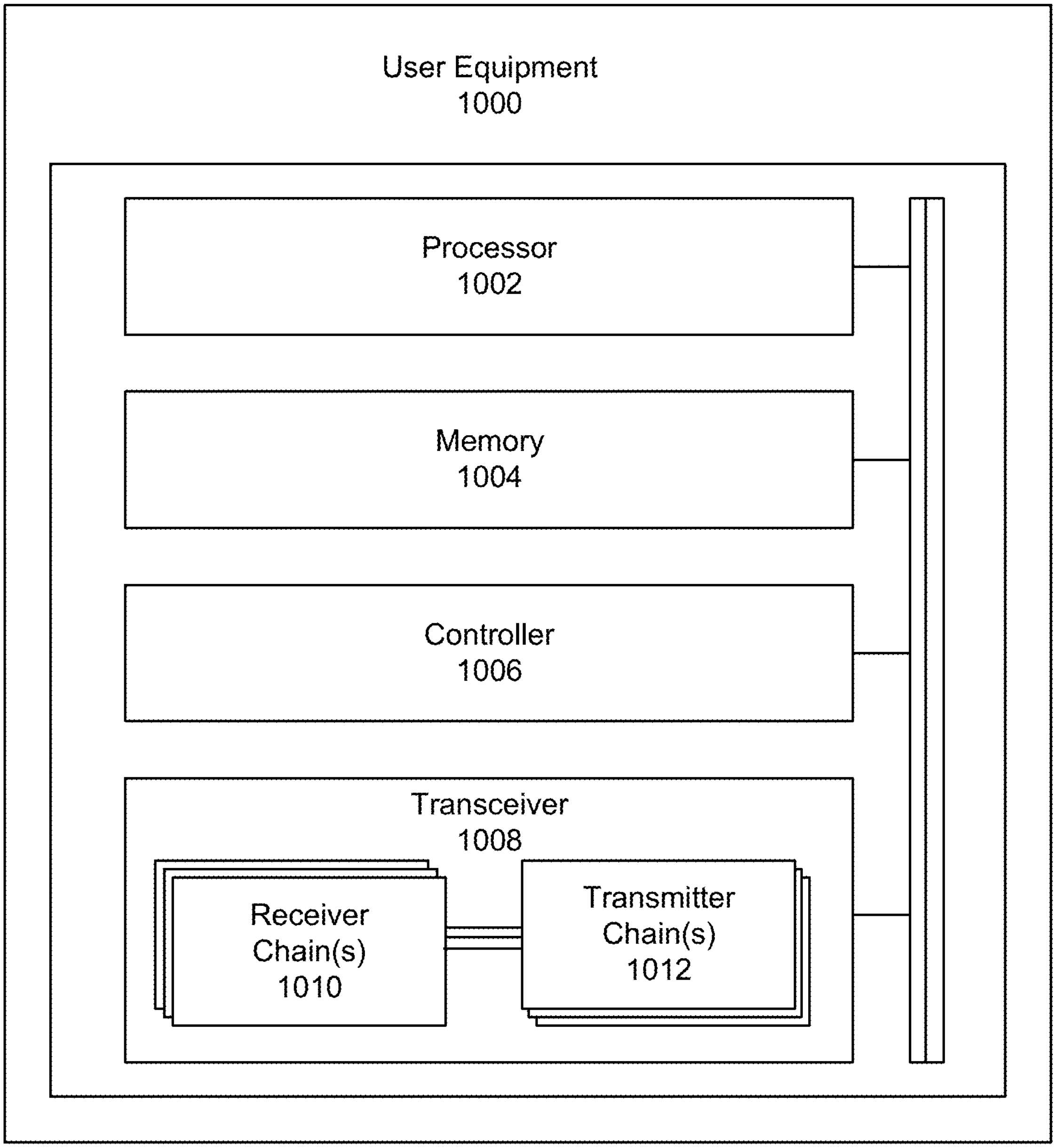
FIG. 10 illustrates an example of a UE, in accordance with aspects of the present disclosure.

FIG. 10 illustrates an example of a UE 1000 in accordance with aspects of the present disclosure. The UE 1000 may include a processor 1002, a memory 1004, a controller 1006, and a transceiver 1008. The processor 1002, the memory 1004, the controller 1006, or the transceiver 1008, or various combinations thereof or various components thereof may be examples of means for performing various aspects of the present disclosure as described herein. These components may be coupled (e.g., operatively, communicatively, functionally, electronically, electrically) via one or more interfaces.

The processor 1002, the memory 1004, the controller 1006, or the transceiver 1008, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 1002 may include an intelligent hardware device (e.g., a general-purpose processor, a DSP, a central processing unit (CPU), an ASIC, a field programmable gate array (FPGA), or any combination thereof). In some implementations, the processor 1002 may be configured to operate the memory 1004. In some other implementations, the memory 1004 may be integrated into the processor 1002. The processor 1002 may be configured to execute computer-readable instructions stored in the memory 1004 to cause the UE 1000 to perform various functions of the present disclosure.

The memory 1004 may include volatile or non-volatile memory. The memory 1004 may store computer-readable, computer-executable code including instructions that, when executed by the processor 1002, cause the UE 1000 to perform various functions described herein. The code may be stored in a non-transitory computer-readable medium such the memory 1004 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 1002 and the memory 1004 coupled with the processor 1002 may be configured to cause the UE 1000 to perform one or more of the UE functions and/or AIoT functions described herein (e.g., executing, by the processor 1002, instructions stored in the memory 1004). Accordingly, the processor 1002 may support wireless communication at the UE 1000 in accordance with examples as disclosed herein. For example, the UE 1000 may be configured to support a means for receiving a first request message comprising a first set of parameters.

The UE 1000 may be configured to support a means for determining, based on the first set of parameters and a corresponding set of parameters stored in the memory 1004, a mismatch of an SQN or a security key. The UE 1000 may be configured to support a means for generating a synchronization ID (e.g., re-synchronization ID) based on a device SQN.

The UE 1000 may be configured to support a means for transmitting a response message that includes at least an expected result based on a default ID of the UE 1000, and the device SQN.

In some embodiments, the UE 1000 is configured to receive a second request message comprising a second set of parameters. In such embodiments, the second set of parameters may include the synchronization ID, an encrypted nonce, an updated SQN, a set of encrypted command parameters (i.e., which describe an AIoT service command), and a MAC-I.

In certain embodiments, the UE 1000 is configured to: A) validate the MAC-I and the synchronization ID; B) decipher the encrypted nonce and the command parameters using the synchronization encryption key; C) perform one or more actions corresponding to the command parameters; and D) transmit a second response message comprising an encrypted command result based on the one or more action. In such embodiments, the command result may be encrypted using the synchronization encryption key.

In some embodiments, the UE 1000 is configured to: A) generate a new nonce in response to the mismatch of the SQN or the security key; and B) generate the synchronization ID and a synchronization encryption key (e.g., re-synchronization key) in parallel based on the new nonce, the device SQN, and a shared secret parameter.

In certain embodiments, the expected result comprises a security context proof based on the default ID (i.e., proof of default ID). In such embodiments, to generate the expected result, the UE 1000 is configured to generate the security context proof based on a HMAC function, e.g., using the default ID, the new nonce, and the shared secret as inputs to the HMAC function.

In certain embodiments, the response message further includes the new nonce, an indication of the mismatch of the SQN or the security key, and a MAC-I based on the response message.

In some embodiments, the first set of parameters includes a first temporary ID, a first SQN, an encrypted nonce, an encrypted command (i.e., described using a set of encrypted command parameters), and a MAC-I. In such embodiments, the UE 1000 is configured to: A) validate the MAC-I and the first temporary ID; and B) determine the mismatch of the SQN or the security key based on the first SQN or the encrypted nonce and command, or both.

In some embodiments, the UE 1000 comprises an IoT device, such as an AIoT. In such embodiments, the first temporary ID is a paging identity of the IoT device. In some embodiments, the UE 1000 is configured to register with a service provider using the default ID.

The controller 1006 may manage input and output signals for the UE 1000. The controller 1006 may also manage peripherals not integrated into the UE 1000. In some implementations, the controller 1006 may utilize an operating system (OS) such as iOS®, ANDROID®, WINDOWS®, or other operating systems. In some implementations, the controller 1006 may be implemented as part of the processor 1002.

In some implementations, the UE 1000 may include at least one transceiver 1008. In some other implementations, the UE 1000 may have more than one transceiver 1008. The transceiver 1008 may represent a wireless transceiver. The transceiver 1008 may include one or more receiver chains 1010, one or more transmitter chains 1012, or a combination thereof.

A receiver chain 1010 may be configured to receive signals (e.g., control information, data, packets) over a wireless medium. For example, the receiver chain 1010 may include one or more antennas for receiving the signal over the air or wireless medium. The receiver chain 1010 may include at least one amplifier (e.g., a low-noise amplifier (LNA)) configured to amplify the received signal. The receiver chain 1010 may include at least one demodulator configured to demodulate the received signal and obtain the transmitted data by reversing the modulation technique applied during transmission of the signal. The receiver chain 1010 may include at least one decoder for decoding/processing the demodulated signal to receive the transmitted data.

A transmitter chain 1012 may be configured to generate and transmit signals (e.g., control information, data, packets). The transmitter chain 1012 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 1012 may also include at least one power amplifier configured to amplify the modulated signal to an appropriate power level suitable for transmission over the wireless medium. The transmitter chain 1012 may also include one or more antennas for transmitting the amplified signal into the air or wireless medium.

Figure 11:
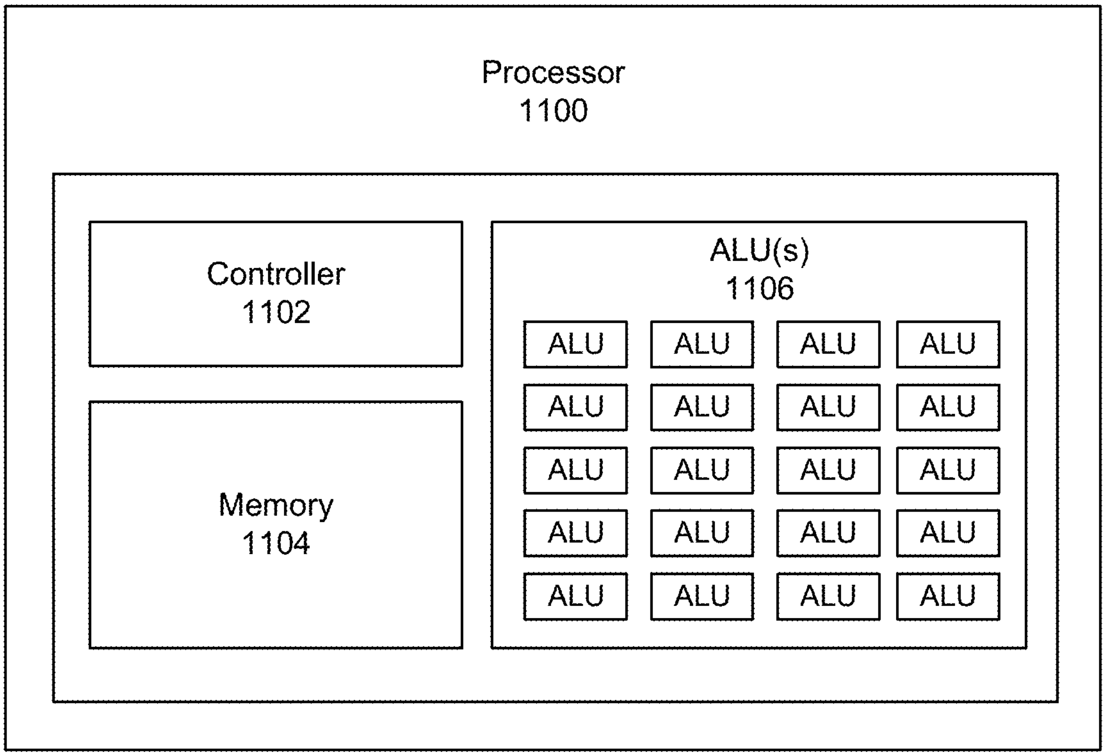
FIG. 11 illustrates an example of a processor, in accordance with aspects of the present disclosure.

FIG. 11 illustrates an example of a processor 1100 in accordance with aspects of the present disclosure. The processor 1100 may be an example of a processor configured to perform various operations in accordance with examples as described herein. The processor 1100 may include a controller 1102 configured to perform various operations in accordance with examples as described herein. The processor 1100 may optionally include at least one memory 1104, which may be, for example, an L1, or L2, or L3 cache. Additionally, or alternatively, the processor 1100 may optionally include one or more arithmetic-logic units (ALUs) 1106. One or more of these components may be in electronic communication or otherwise coupled (e.g., operatively, communicatively, functionally, electronically, electrically) via one or more interfaces (e.g., buses).

The processor 1100 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 1100) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 1102 may be configured to manage and coordinate various operations (e.g., signaling, receiving, obtaining, retrieving, transmitting, outputting, forwarding, storing, determining, identifying, accessing, writing, reading) of the processor 1100 to cause the processor 1100 to support various operations in accordance with examples as described herein. For example, the controller 1102 may operate as a control unit of the processor 1100, generating control signals that manage the operation of various components of the processor 1100. These control signals include enabling or disabling functional units, selecting data paths, initiating memory access, and coordinating timing of operations.

The controller 1102 may be configured to fetch (e.g., obtain, retrieve, receive) instructions from the memory 1104 and determine subsequent instruction(s) to be executed to cause the processor 1100 to support various operations in accordance with examples as described herein. The controller 1102 may be configured to track memory address of instructions associated with the memory 1104. The controller 1102 may be configured to decode instructions to determine the operation to be performed and the operands involved. For example, the controller 1102 may be configured to interpret the instruction and determine control signals to be output to other components of the processor 1100 to cause the processor 1100 to support various operations in accordance with examples as described herein. Additionally, or alternatively, the controller 1102 may be configured to manage flow of data within the processor 1100. The controller 1102 may be configured to control transfer of data between registers, arithmetic logic units (ALUs), and other functional units of the processor 1100.

The memory 1104 may include one or more caches (e.g., memory local to or included in the processor 1100 or other memory, such RAM, ROM, DRAM, SDRAM, SRAM, MRAM, flash memory, etc. In some implementations, the memory 1104 may reside within or on a processor chipset (e.g., local to the processor 1100). In some other implementations, the memory 1104 may reside external to the processor chipset (e.g., remote to the processor 1100).

The memory 1104 may store computer-readable, computer-executable code including instructions that, when executed by the processor 1100, cause the processor 1100 to perform various functions described herein. The code may be stored in a non-transitory computer-readable medium such as system memory or another type of memory. The controller 1102 and/or the processor 1100 may be configured to execute computer-readable instructions stored in the memory 1104 to cause the processor 1100 to perform various functions. For example, the processor 1100 and/or the controller 1102 may be coupled with or to the memory 1104, the processor 1100, the controller 1102, and the memory 1104 may be configured to perform various functions described herein. In some examples, the processor 1100 may include multiple processors and the memory 1104 may include multiple memories. One or more of the multiple processors may be coupled with one or more of the multiple memories, which may, individually or collectively, be configured to perform various functions herein.

The one or more ALUs 1106 may be configured to support various operations in accordance with examples as described herein. In some implementations, the one or more ALUs 1106 may reside within or on a processor chipset (e.g., the processor 1100). In some other implementations, the one or more ALUs 1106 may reside external to the processor chipset (e.g., the processor 1100). One or more ALUs 1106 may perform one or more computations such as addition, subtraction, multiplication, and division on data. For example, one or more ALUs 1106 may receive input operands and an operation code, which determines an operation to be executed. One or more ALUs 1106 be configured with a variety of logical and arithmetic circuits, including adders, subtractors, shifters, and logic gates, to process and manipulate the data according to the operation. Additionally, or alternatively, the one or more ALUs 1106 may support logical operations such as AND, OR, exclusive-OR (XOR), not-OR (NOR), and not-AND (NAND), enabling the one or more ALUs 1106 to handle conditional operations, comparisons, and bitwise operations.

In various embodiments, the processor 1100 may support the functions of a UE (e.g., without USIM) or an AIoT device, in accordance with examples as disclosed herein. For example, the processor 1100 may be configured to support a means for receiving a first request message comprising a first set of parameters.

The processor 1100 may be configured to support a means for determining, based on the first set of parameters and a corresponding set of parameters stored in the UE, a mismatch of an SQN or a security key. The processor 1100 may be configured to support a means for generating a synchronization ID (e.g., re-synchronization ID) based on a device SQN.

The processor 1100 may be configured to support a means for transmitting a response message that includes at least an expected result based on a default ID of the UE, and the device SQN.

In some embodiments, the processor 1100 is configured to receive a second request message comprising a second set of parameters. In such embodiments, the second set of parameters may include the synchronization ID, an encrypted nonce, an updated SQN, a set of encrypted command parameters (i.e., which describe a AIoT service command), and a MAC-I.

In certain embodiments, the processor 1100 is configured to: A) validate the MAC-I and the synchronization ID; B) decipher the encrypted nonce and the command parameters using the synchronization encryption key; C) perform one or more actions corresponding to the command parameters; and D) transmit a second response message comprising an encrypted command result based on the one or more action. In such embodiments, the command result may be encrypted using the synchronization encryption key.

In some embodiments, the processor 1100 is configured to: A) generate a new nonce in response to the mismatch of the SQN or the security key; and B) generate the synchronization ID and a synchronization encryption key (e.g., re-synchronization key) in parallel based on the new nonce, the device SQN, and a shared secret parameter.

In certain embodiments, the expected result comprises a security context proof based on the default ID (i.e., proof of default ID). In such embodiments, to generate the expected result, the processor 1100 is configured to generate the security context proof based on a HMAC function, e.g., using the default ID, the new nonce, and the shared secret as inputs to the HMAC function.

In certain embodiments, the response message further includes the new nonce, an indication of the mismatch of the SQN or the security key, and a MAC-I based on the response message.

In some embodiments, the first set of parameters includes a first temporary ID, a first SQN, an encrypted nonce, an encrypted command (i.e., described using a set of encrypted command parameters), and a MAC-I. In such embodiments, the processor 1100 is configured to: A) validate the MAC-I and the first temporary ID; and B) determine the mismatch of the SQN or the security key based on the first SQN or the encrypted nonce and command, or both.

In some embodiments, the UE comprises an IoT device, such as an AIoT. In such embodiments, the first temporary ID is a paging identity of the IoT device. In some embodiments, the processor 1100 is configured to register with a service provider using the default ID.

In various embodiments, the processor 1100 may support the functions of a network entity (e.g., an AIoT function, an AIoT reader, a NEF, and/or an AF), in accordance with examples as disclosed herein. For example, the processor 1100 may be configured to support a means for transmitting a first request message comprising a first set of parameters.

The processor 1100 may be configured to support a means for receiving a response message comprising at least an indication of a mismatch of a SQN or a security key, and a device SQN.

The processor 1100 may be configured to support a means for generating a synchronization ID based on the device SQN. In some embodiments, the processor 1100 is configured to generate the synchronization ID and a synchronization encryption key in parallel based on a new nonce (e.g., contained in the response message), the device SQN, and the shared secret parameter.

The processor 1100 may be configured to support a means for determining an updated SQN based on the device SQN. In certain embodiments, the processor 1100 is configured to synchronize a system SQN to the device SQN in response to a verification of the expected result, and to increment the system SQN to form the updated SQN.

In some embodiments, the processor 1100 is configured to transmit a second request message comprising a second set of parameters. In such embodiments, the second set of parameters comprises the synchronization ID, an encrypted nonce, the updated SQN, a set of encrypted command parameters, and a MAC-I.

In certain embodiments, the processor 1100 is configured to: A) generate the encrypted nonce and the set of encrypted command parameters using the synchronization encryption key; B) receive a second response message comprising an encrypted command result based on the one or more action; and C) decipher the command result using the synchronization encryption key.

In some embodiments, the response message further includes a new nonce and an expected result based on a default ID of the UE. In certain embodiments, the expected result comprises a security context proof based on a default ID, wherein the default ID is stored at the wireless communication network entity. In such embodiments, the processor 1100 is configured to verify the security context proof based on a HMAC function, e.g., using the default ID, the new nonce, and a shared secret as inputs to the HMAC function.

In some embodiments, the first set of parameters comprise a first temporary ID, a first SQN, an encrypted nonce, an encrypted command (i.e., described using a set of encrypted command parameters), and a message authentication code for integrity (MAC-I). In certain embodiments, the first temporary ID comprises a paging identity of an IoT device.

Figure 12:
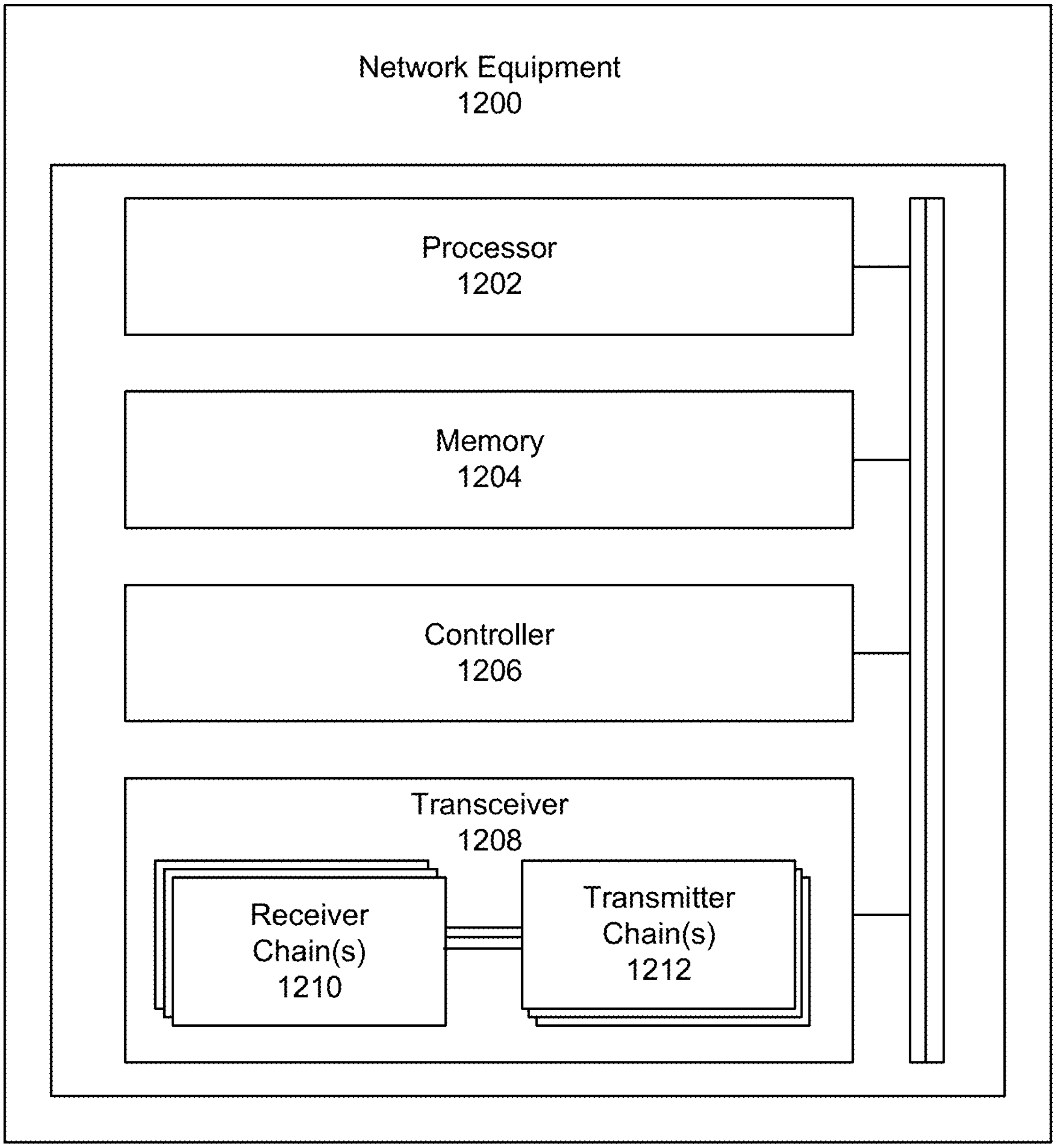
FIG. 12 illustrates an example of a network equipment (NE), in accordance with aspects of the present disclosure.

FIG. 12 illustrates an example of a NE 1200 in accordance with aspects of the present disclosure. The NE 1200 may include a processor 1202, a memory 1204, a controller 1206, and a transceiver 1208. The processor 1202, the memory 1204, the controller 1206, or the transceiver 1208, or various combinations thereof or various components thereof may be examples of means for performing various aspects of the present disclosure as described herein. These components may be coupled (e.g., operatively, communicatively, functionally, electronically, electrically) via one or more interfaces.

The processor 1202, the memory 1204, the controller 1206, or the transceiver 1208, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 1202 may include an intelligent hardware device (e.g., a general-purpose processor, a DSP, a CPU, an ASIC, an FPGA, or any combination thereof). In some implementations, the processor 1202 may be configured to operate the memory 1204. In some other implementations, the memory 1204 may be integrated into the processor 1202. The processor 1202 may be configured to execute computer-readable instructions stored in the memory 1204 to cause the NE 1200 to perform various functions of the present disclosure.

The memory 1204 may include volatile or non-volatile memory. The memory 1204 may store computer-readable, computer-executable code including instructions when executed by the processor 1202 cause the NE 1200 to perform various functions described herein. The code may be stored in a non-transitory computer-readable medium such the memory 1204 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 1202 and the memory 1204 coupled with the processor 1202 may be configured to cause the NE 1200 to perform one or more of the network entity functions described herein (e.g., executing, by the processor 1202, instructions stored in the memory 1204). For example, the processor 1202 may support wireless communication at the NE 1200 in accordance with examples as disclosed herein.

In various embodiments, the NE 1200 may be configured to support a means for transmitting a first request message comprising a first set of parameters. The NE 1200 may be configured to support a means for receiving a response message comprising at least an indication of a mismatch of a SQN or a security key, and a device SQN.

The NE 1200 may be configured to support a means for generating a synchronization ID based on the device SQN. In some embodiments, the NE 1200 is configured to generate the synchronization ID and a synchronization encryption key in parallel based on a new nonce (e.g., contained in the response message), the device SQN, and the shared secret parameter.

The NE 1200 may be configured to support a means for determining an updated SQN based on the device SQN. In certain embodiments, the NE 1200 is configured to synchronize a system SQN to the device SQN in response to a verification of the expected result, and to increment the system SQN to form the updated SQN.

In some embodiments, the NE 1200 is configured to transmit a second request message comprising a second set of parameters. In such embodiments, the second set of parameters comprises the synchronization ID, an encrypted nonce, the updated SQN, a set of encrypted command parameters, and a MAC-I.

In certain embodiments, the NE 1200 is configured to: A) generate the encrypted nonce and the set of encrypted command parameters using the synchronization encryption key; B) receive a second response message comprising an encrypted command result based on the one or more action; and C) decipher the command result using the synchronization encryption key.

In some embodiments, the response message further includes a new nonce and an expected result based on a default ID of the UE. In certain embodiments, the expected result comprises a security context proof based on a default ID, wherein the default ID is stored at the wireless communication network entity. In such embodiments, the NE 1200 is configured to verify the security context proof based on a HMAC function, e.g., using the default ID, the new nonce, and a shared secret as inputs to the HMAC function.

In some embodiments, the first set of parameters comprise a first temporary ID, a first SQN, an encrypted nonce, an encrypted command (i.e., described using a set of encrypted command parameters), and a message authentication code for integrity (MAC-I). In certain embodiments, the first temporary ID comprises a paging identity of an IoT device.

The controller 1206 may manage input and output signals for the NE 1200. The controller 1206 may also manage peripherals not integrated into the NE 1200. In some implementations, the controller 1206 may utilize an operating system such as iOS®, ANDROID®, WINDOWS®, or other operating systems. In some implementations, the controller 1206 may be implemented as part of the processor 1202.

In some implementations, the NE 1200 may include at least one transceiver 1208. In some other implementations, the NE 1200 may have more than one transceiver 1208. The transceiver 1208 may represent a wireless transceiver. The transceiver 1208 may include one or more receiver chains 1210, one or more transmitter chains 1212, or a combination thereof.

A receiver chain 1210 may be configured to receive signals (e.g., control information, data, packets) over a wireless medium. For example, the receiver chain 1210 may include one or more antennas for receiving the signal over the air or wireless medium. The receiver chain 1210 may include at least one amplifier (e.g., a low-noise amplifier (LNA)) configured to amplify the received signal. The receiver chain 1210 may include at least one demodulator configured to demodulate the received signal and obtain the transmitted data by reversing the modulation technique applied during transmission of the signal. The receiver chain 1210 may include at least one decoder for decoding/processing the demodulated signal to receive the transmitted data.

A transmitter chain 1212 may be configured to generate and transmit signals (e.g., control information, data, packets). The transmitter chain 1212 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 1212 may also include at least one power amplifier configured to amplify the modulated signal to an appropriate power level suitable for transmission over the wireless medium. The transmitter chain 1212 may also include one or more antennas for transmitting the amplified signal into the air or wireless medium.

Figure 13:
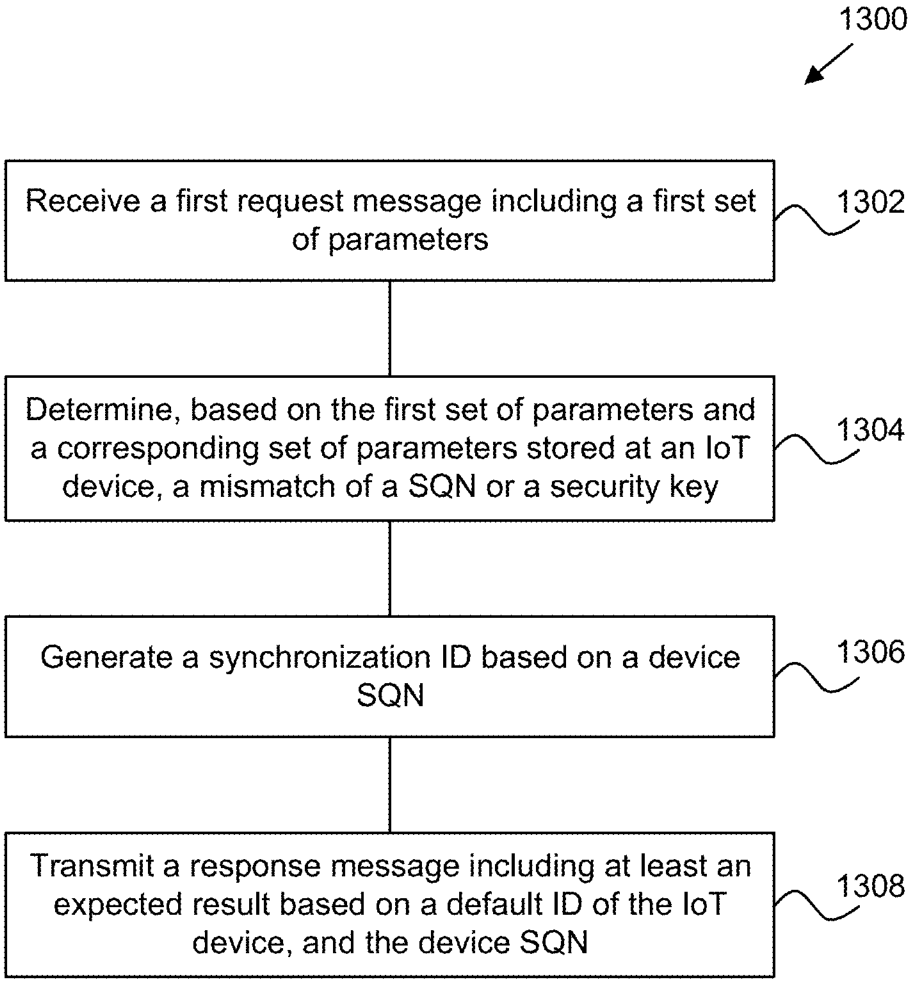
FIG. 13 illustrates a flowchart of a method performed by a UE, in accordance with aspects of the present disclosure.

FIG. 13 depicts one embodiment of a method 1300 in accordance with aspects of the present disclosure. The operations of the method 1300 may be implemented by a UE as described herein. In some implementations, the UE may execute a set of instructions to control the function elements of the UE to perform the described functions.

At step 1302, the method 1300 may include receiving a first request message including a first set of parameters. The operations of step 1302 may be performed in accordance with examples as described herein. In some implementations, aspects of the operations of step 1302 may be performed by a UE, as described with reference to FIG. 10.

At step 1304, the method 1300 may include determining, based on the first set of parameters and a corresponding set of parameters stored at a UE, a mismatch of an SQN or a security key. The operations of step 1304 may be performed in accordance with examples as described herein. In some implementations, aspects of the operations of step 1304 may be performed by a UE, as described with reference to FIG. 10.

At step 1306, the method 1300 may include a generating a synchronization ID (e.g., re-synchronization ID) based on a device SQN. The operations of step 1306 may be performed in accordance with examples as described herein. In some implementations, aspects of the operations of step 1306 may be performed by a UE, as described with reference to FIG. 10.

At step 1308, the method 1300 may include receiving transmitting a response message including at least an expected result based on a default ID of the UE, and the device SQN. The operations of step 1308 may be performed in accordance with examples as described herein. In some implementations, aspects of the operations of step 1308 may be performed by a UE, as described with reference to FIG. 10.

It should be noted that the method 1300 described herein describes one possible implementation, and that the operations and the steps may be rearranged or otherwise modified and that other implementations are possible.

Figure 14:
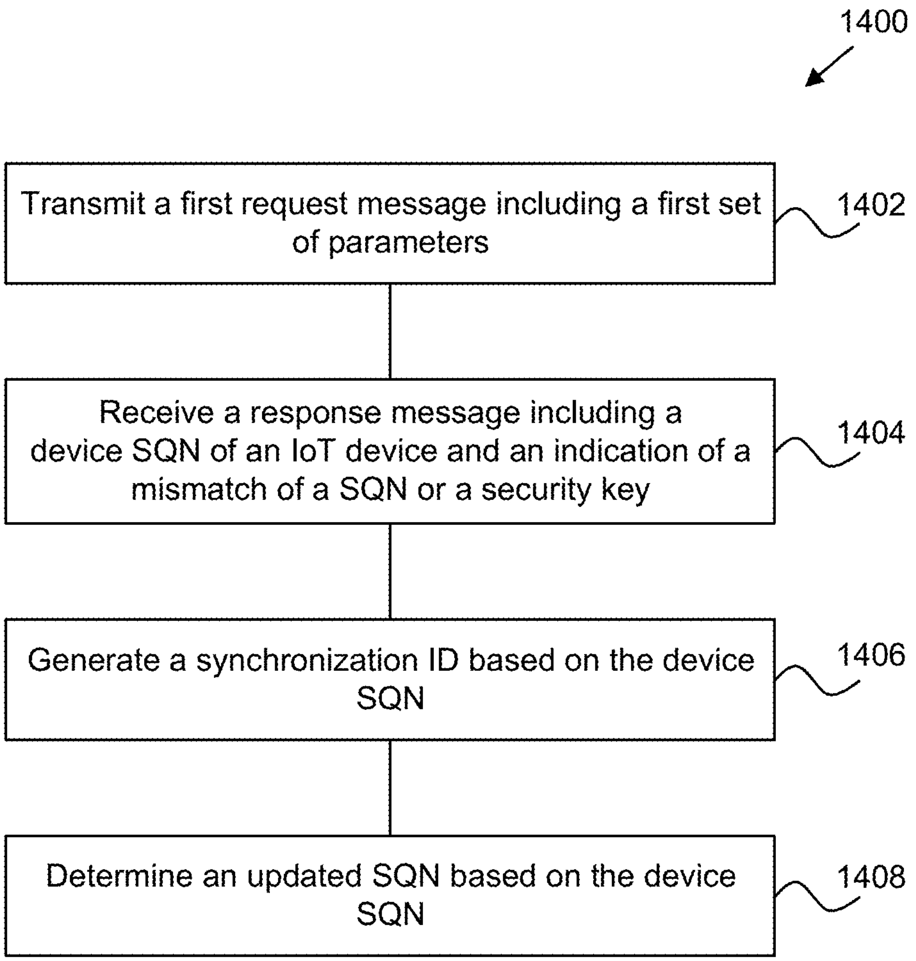
FIG. 14 illustrates a flowchart of a method performed by a NE, in accordance with aspects of the present disclosure.

FIG. 14 depicts one embodiment of a method 1400 in accordance with aspects of the present disclosure. The operations of the method 1400 may be implemented by a NE as described herein. In some implementations, the NE may execute a set of instructions to control the function elements of the NE to perform the described functions.

At step 1402, the method 1400 may include transmitting (e.g., to a UE or AIoT device) a first request message including a first set of parameters. The operations of step 1402 may be performed in accordance with examples as described herein. In some implementations, aspects of the operations of step 1402 may be performed by a NE, as described with reference to FIG. 12.

At step 1404, the method 1400 may include receiving (e.g., from the UE or AIoT device) a response message including a device SQN and an indication of a mismatch of an SQN or a security key. The operations of step 1404 may be performed in accordance with examples as described herein. In some implementations, aspects of the operations of step 1404 may be performed by a NE, as described with reference to FIG. 12.

At step 1406, the method 1400 may include generating a synchronization ID based on the device SQN. The operations of step 1406 may be performed in accordance with examples as described herein. In some implementations, aspects of the operations of step 1406 may be performed by a NE, as described with reference to FIG. 12.

At step 1408, the method 1400 may include determining an updated SQN based on the device SQN. The operations of step 1408 may be performed in accordance with examples as described herein. In some implementations, aspects of the operations of step 1408 may be performed by a NE, as described with reference to FIG. 12.

It should be noted that the method 1400 described herein describes one possible implementation, and that the operations and the steps may be rearranged or otherwise modified and that other implementations are possible.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An internet-of-things (IoT) device for wireless communication, comprising:

at least one memory; and at least one processor coupled with the at least one memory and configured to cause the IoT device to:

receive a first request message comprising a first set of parameters;

determine a security parameter mismatch based on the first set of parameters and a corresponding set of parameters stored in the IoT device, wherein the security parameter mismatch comprises a mismatch of a sequence number (SQN) or a mismatch of a security key;

generate a nonce in response to the security parameter mismatch;

generate a synchronization identifier (ID) based on the generated nonce, a device SQN, and a shared secret parameter;

generate a synchronization encryption key based on the generated nonce, the device SON, and the shared secret parameter; and transmit a response message comprising at least the device SQN, the generated nonce, and an expected result based on a default ID of the IoT device.

2. The IoT device of claim 1, wherein the at least one processor is configured to cause the IoT device to:

receive a second request message comprising a second set of parameters, wherein the second set of parameters comprises the synchronization ID, an encrypted nonce, an updated SQN, a set of encrypted command parameters, and a message authentication code for integrity (MAC-I), wherein the encrypted nonce is different than the generated nonce.

3. The IoT device of claim 2, wherein the at least one processor is configured to cause the IoT device to:

validate the MAC-I and the synchronization ID;

decipher the encrypted nonce and the command parameters using the synchronization encryption key;

perform one or more actions corresponding to the command parameters; and transmit a second response message comprising an encrypted command result based on the one or more actions, wherein the command result is encrypted using the synchronization encryption key.

4. The IoT device of claim 1, wherein the at least one processor is configured to cause the IoT device to:

generate the synchronization ID and the synchronization encryption key in parallel based on the generated nonce, the device SQN, and a shared secret parameter.

5. The IoT device of claim 1, wherein the expected result comprises a security context proof based on the default ID, and wherein to generate the expected result, the at least one processor is configured to cause the IoT device to generate the security context proof based on a hash-based message authentication code (HMAC) function, using the default ID, the generated nonce, and the shared secret parameter as inputs to the HMAC function.

6. The IoT device of claim 1, wherein the response message further comprises the generated nonce, an indication of the mismatch of the SQN or the security key, and a message authentication code for integrity (MAC-I) based on the response message.

7. The IoT device of claim 1, wherein the first set of parameters comprise a first temporary ID, a first SQN, an encrypted nonce, an encrypted command, and a message authentication code for integrity (MAC-I), and wherein the at least one processor is configured to cause the IoT device to:

validate the MAC-I and the first temporary ID; and determine the mismatch of the SQN or the security key based on the first SQN or the encrypted nonce and command, or both, wherein the encrypted nonce is different than the generated nonce.

8. The IoT device of claim 7, wherein the first temporary ID comprises a paging identity of the IoT device, wherein the at least one processor is configured to cause the IoT device to register with a service provider using the default ID.

9. A method of an internet-of-things (IoT) device, the method comprising:

receiving a first request message comprising a first set of parameters;

determining a security parameter mismatch based on the first set of parameters and a corresponding set of parameters stored in the IoT device, wherein the security parameter mismatch comprises a mismatch of a sequence number (SQN) or a mismatch of a security key;

generating a nonce in response to the security parameter mismatch;

generating a synchronization identifier (ID) based on the generated nonce, a device SQN, and a shared secret parameter;

generating a synchronization encryption key based on the generated nonce, the device SQN, and the shared secret parameter; and transmitting a response message comprising at least the device SQN and an expected result based on a default ID of the IoT device.

10. The method of claim 9, further comprising:

receiving a second request message comprising a second set of parameters, wherein the second set of parameters comprises the synchronization ID, an encrypted nonce, an updated SQN, a set of encrypted command parameters, and a message authentication code for integrity (MAC-I), wherein the encrypted nonce is different than the generated nonce.

11. The method of claim 9, further comprising:

generating the synchronization ID and the synchronization encryption key in parallel based on the generated nonce, the device SQN, and a shared secret parameter.

12. An apparatus in a wireless communication network entity, comprising:

at least one memory; and at least one processor coupled with the at least one memory and configured to cause the wireless communication network entity to:

transmit a first request message comprising a first set of parameters;

receive a response message comprising an indication of a mismatch of a sequence number (SQN) or a security key, wherein the response message further comprises a device SQN of an internet-of-things (IoT) device, a nonce, and an expected result;

generate a synchronization identifier (ID) based on the received nonce, the device SQN, and a shared secret parameter;

generate a synchronization encryption key based on the received nonce, the device SQN, and the shared secret parameter; and determine an updated SQN based on the device SQN.

13. The apparatus of claim 12, wherein the at least one processor is configured to cause the wireless communication network entity to:

transmit a second request message comprising a second set of parameters, wherein the second set of parameters comprises the synchronization ID, an encrypted nonce, the updated SQN, a set of encrypted command parameters, and a message authentication code for integrity (MAC-I), wherein the encrypted nonce is different than the received nonce.

14. The apparatus of claim 13, wherein the at least one processor is configured to cause the wireless communication network entity to:

generate the encrypted nonce and the set of encrypted command parameters using the synchronization encryption key;

receive a second response message comprising an encrypted command result based on the command parameters; and decipher the command result using the synchronization encryption key.

15. The apparatus of claim 12, wherein the expected result is based on a default ID of the IoT device, wherein the at least one processor is configured to cause the wireless communication network entity to synchronize a system SQN to the device SQN in response to a successful verification of the expected result, and wherein the updated SQN comprises an incremented system SQN.

16. The apparatus of claim 12, wherein the expected result comprises a security context proof based on a default ID of the IoT device, wherein the default ID is stored at the wireless communication network entity, and wherein the at least one processor is configured to cause the wireless communication network entity to verify the security context proof based on a hash-based message authentication code (HMAC) function, using the default ID, the received nonce, and the shared secret parameter as inputs to the HMAC function.

17. The apparatus of claim 12, wherein the at least one processor is configured to cause the wireless communication network entity to:

generate the synchronization ID and the synchronization encryption key in parallel based on the received nonce, the device SQN, and the shared secret parameter.

18. The apparatus of claim 12, wherein the first set of parameters comprise a first temporary ID, a first SQN, an encrypted nonce, an encrypted command, and a message authentication code for integrity (MAC-I), wherein the encrypted nonce is different than the received nonce.

19. The apparatus of claim 18, wherein the first temporary ID comprises a paging identity of the IoT device.

20. A method performed by a wireless communication network entity, the method comprising:

transmitting a first request message comprising a first set of parameters;

receiving a response message comprising an indication of a mismatch of a sequence number (SQN) or a security key, wherein the response message further comprises a device SQN of an internet-of-things (IoT) device, a nonce, and an expected result;

generating a synchronization identifier (ID) based on the received nonce, the device SQN, and a shared secret parameter;

generating a synchronization encryption key based on the received nonce, the device SQN, and the shared secret parameter; and determining an updated SQN based on the device SQN.

* * * * *